(12) United States Patent
Seo et al.

(10) Patent No.: US 9,242,900 B2
(45) Date of Patent: Jan. 26, 2016

(54) POROUS GEOPOLYMER MATERIALS

(75) Inventors: Dong-Kyun Seo, Chandler, AZ (US);
Dinesh Medpelli, Tempe, AZ (US);
Jungmin Seo, Tempe, AZ (US)

(73) Assignee: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 862 days.

(21) Appl. No.: 13/513,220

(22) PCT Filed: Dec. 1, 2010

(86) PCT No.: PCT/US2010/058497
§ 371 (c)(1),
(2), (4) Date: Nov. 21, 2012

(87) PCT Pub. No.: WO2011/068830
PCT Pub. Date: Jun. 9, 2011

(65) Prior Publication Data
US 2013/0055924 A1    Mar. 7, 2013

Related U.S. Application Data

(60) Provisional application No. 61/265,646, filed on Dec. 1, 2009.

(51) Int. Cl.
*B29C 67/20* (2006.01)
*C08J 9/26* (2006.01)
(Continued)

(52) U.S. Cl.
CPC ............. *C04B 28/006* (2013.01); *C04B 12/005* (2013.01); *C04B 2111/0081* (2013.01);
(Continued)

(58) Field of Classification Search
USPC .................................. 264/49, 50, 69, 86, 87
See application file for complete search history.

(56) References Cited

U.S. PATENT DOCUMENTS

| | | |
|---|---|---|
| 3,558,273 A | 1/1971 | Beck |
| 4,923,830 A | 5/1990 | Everhart et al. |

(Continued)

FOREIGN PATENT DOCUMENTS

| | | |
|---|---|---|
| EP | 0013497 | 7/1980 |
| EP | 454239 | 10/1991 |

(Continued)

OTHER PUBLICATIONS

Duxson et al. "Geopolymer technology: the current state of the art" J Mater Sci (2007) 42:2917-2933.

(Continued)

*Primary Examiner* — Sing P Chan
(74) *Attorney, Agent, or Firm* — Fish & Richardson P.C.

(57) ABSTRACT

Preparing porous materials includes forming a mixture including a geopolymer resin and a liquid between which a nanoscale (1-1000 nm), microscale (1-1000 m), and/or milliscale (1-10 mm) phase separation occurs. The mixture is solidified (e.g., at an ambient temperature or a relatively low temperature), and a portion (e.g., a majority or a significant majority) of the liquid is removed from the solidified mixture. The liquid can include organic liquids from agricultural, geological, industrial, or household sources. The porous materials have accessible pores with a range of pore sizes including nanoscale pore sizes, microscale pore sizes, milliscale pore sizes, or a combination thereof. The porous material may be treated further to form another material, such as a composite.

19 Claims, 25 Drawing Sheets

(51) Int. Cl.
*C08J 9/28* (2006.01)
*B28B 1/08* (2006.01)
*C04B 28/00* (2006.01)
*C04B 12/00* (2006.01)
*C04B 111/00* (2006.01)
*C04B 111/28* (2006.01)

(52) U.S. Cl.
CPC .............. *C04B2111/00793* (2013.01); *C04B 2111/00801* (2013.01); *C04B 2111/00836* (2013.01); *C04B 2111/00853* (2013.01); *C04B 2111/28* (2013.01); *Y02W 30/94* (2015.05)

(56) References Cited

U.S. PATENT DOCUMENTS

| | | |
|---|---|---|
| 5,045,511 A | 9/1991 | Bosomworth et al. |
| 5,244,726 A | 9/1993 | Laney et al. |
| 5,342,595 A | 8/1994 | Davidovits et al. |
| 5,680,713 A | 10/1997 | Forbert et al. |
| 5,725,836 A | 3/1998 | Rouanet et al. |
| 6,131,305 A | 10/2000 | Forbert et al. |
| 6,187,248 B1 | 2/2001 | O'Neill et al. |
| 6,254,845 B1 | 7/2001 | Ohashi et al. |
| 6,642,285 B1 | 11/2003 | Bohner |
| 6,699,808 B1 | 3/2004 | Schwertfeger et al. |
| 6,893,564 B2 | 5/2005 | Mueller et al. |
| 7,297,321 B2 | 11/2007 | Shpeizer et al. |
| 7,456,123 B2 | 11/2008 | Wachter |
| 7,771,686 B2 | 8/2010 | Sagoe-crentsil et al. |
| 8,557,214 B2 | 10/2013 | Seo |
| 2001/0023296 A1 | 9/2001 | Kato et al. |
| 2003/0108785 A1 | 6/2003 | Wu et al. |
| 2004/0047798 A1 | 3/2004 | Oh et al. |
| 2005/0152829 A1 | 7/2005 | Shpeizer et al. |
| 2005/0272593 A1 | 12/2005 | Wachter |
| 2006/0057355 A1 | 3/2006 | Suzuki et al. |
| 2006/0292054 A1 | 12/2006 | Chaumonnot et al. |
| 2007/0003749 A1 | 1/2007 | Asgari |
| 2007/0009689 A1 | 1/2007 | Murer |
| 2007/0048605 A1 | 3/2007 | Pez et al. |
| 2007/0125271 A1 | 6/2007 | Barlet-Gouedard et al. |
| 2007/0125272 A1 | 6/2007 | Johnson |
| 2007/0128491 A1 | 6/2007 | Chisholm et al. |
| 2007/0259979 A1 | 11/2007 | Lee |
| 2008/0028994 A1 | 2/2008 | Barlet-Gouedard et al. |
| 2008/0028995 A1 | 2/2008 | Barlet-Gouedard et al. |
| 2008/0067149 A1 | 3/2008 | Piesslinger-Schweiger et al. |
| 2008/0090716 A1 | 4/2008 | Cherepy |
| 2008/0226893 A1 | 9/2008 | Yang et al. |
| 2009/0026413 A1 | 1/2009 | Patoux et al. |
| 2009/0041653 A1 | 2/2009 | Hwang et al. |
| 2009/0256262 A1* | 10/2009 | Farnworth et al. ............ 257/760 |
| 2009/0288557 A1 | 11/2009 | Carati et al. |
| 2010/0104500 A1 | 4/2010 | Holland |
| 2010/0222204 A1 | 9/2010 | Frizon et al. |
| 2011/0092363 A1 | 4/2011 | Seo et al. |
| 2012/0007020 A1 | 1/2012 | Tarascon et al. |
| 2012/0235073 A1 | 9/2012 | Seo et al. |
| 2013/0071737 A1 | 3/2013 | Belharouak et al. |
| 2013/0137010 A1 | 5/2013 | Aitken et al. |
| 2013/0153830 A1 | 6/2013 | Seo et al. |
| 2014/0342156 A1 | 11/2014 | Seo et al. |

FOREIGN PATENT DOCUMENTS

| | | |
|---|---|---|
| EP | 0497966 | 8/1992 |
| EP | 497466 | 8/1995 |
| EP | 1230008 | 8/2002 |
| EP | 2758355 | 7/2014 |
| JP | 2003206112 | 7/2003 |
| KR | 10-2001-0082910 | 8/2001 |
| KR | 10-2001-0107049 | 12/2001 |
| WO | WO9932218 | 7/1999 |
| WO | WO0128675 | 4/2001 |
| WO | WO2004018090 | 4/2004 |
| WO | WO2005019130 | 3/2005 |
| WO | WO2005054340 | 6/2005 |
| WO | WO2007064053 | 6/2007 |
| WO | WO2007129991 | 11/2007 |
| WO | WO2008124343 | 10/2008 |
| WO | WO2009/050196 | 4/2009 |
| WO | WO2009140030 | 11/2009 |
| WO | WO2011046910 | 4/2011 |
| WO | WO2011068830 | 6/2011 |
| WO | WO2012018890 | 2/2012 |
| WO | WO2013044016 | 3/2013 |
| WO | WO2015006010 | 1/2015 |

OTHER PUBLICATIONS

Komnitsas et al. "Geopolymerisation: A review and prospects for the minerals industry" Minerals Engineering 20(2007), pp. 1261-1277.
Provis et al. "Do Geopolymers Actually Contain Nanocrystalline Zeolites? A Reexamination of Existing Results" Chem. Mater. 2005, 17, pp. 3075-3085.
Thomas et al. "Amorphous Zeolites" Angew. Chem. Inr. Ed. Engl. I9 (1980) No. 9, pp. 745-746.
Bell et al. "Nano-and Microporosity in Geopolymer Gels" Microsc Microanal 12(Supp 2), 2006.
PCT Examiner, Lee, Young Wan, International Search Report and Written Opinion of International Application No. PCT/US2010/058497 mailed Aug. 30, 2011, 11 pages.
PCT Officer, Becamel, Philippe, International Preliminary Report on Patentability of International Application No. PCT/US2010/058497 mailed Jun. 5, 2012, 7 pages.
W. M. Kriven, "Inorganic Polysialates or 'Geopolymers'" American Ceramic Society Bulletin, 2010, vol. 89, No. 4, pp. 31-34.
Kriven et al., "Microstructure and nanoporosity of as-set geopolymers" Ceramic Engineering and Science Proceedings 2007, vol. 27, pp. 491-503.
Joseph Davidovits, "Geopolymer Chemistry and Applications" Jun. 2008, Chapter 1, 17 pages.
A. S. Wagh, "Chemically Bonded Phosphate Ceramics—A Novel Class of Geopolymers," Ceramic Transactions 2005, vol. 165, 12 pages.
Nedelec, J.M., "Sol-Gel Processing of Nanostructured Inorganic Scintillating Materials", Journal of Nanomaterials, vol. 2007, Article ID 36392, 8 pages, 2007.
Sivashanmugam, A. et al., "Glycine-Assisted Sol-Gel Combustion Synthesis and Characterization of Aluminum-Doped LiNiVO4 for Use in Lithium-Ion Batteries", Journal of the Electrochemical Society, vol. 153, No. 3, A497-A503, 2006.
Ju Dong-Ying et al., "Low-temperature sintering method for NiCuZn ferrite and effects of Mn addition on electromagnetic properties", Transactions of Nonferrous Metals Society of China, vol. 16, Supplement 1, pp. s67-s70, Jun. 2006.
PCT Examiner Lee, Sung Joon, PCT/US2009/041286, Written Opinion and International Search Report mailed Dec. 16, 2009, 7 pages.
Rolison, D. R. et al., "Electrically conductive oxide aerogels: new materials in electrochemistry", Journal of Materials Chemistry, vol. 11, pp. 963-980, 2001.
Zhang et al., "Mesostructured Forms of $\gamma$-Al2O3", J. Am. Chem. Soc. 124, pp. 1592-1593 (2002).
Baumann, Theodore F. et al., "Synthesis of High-Surface-Area Alumina Aerogels without the Use of Alkoxide Precursors", Chem. Mater., vol. 17, No. 2, pp. 395-401, 2005.
Kübel, Christian et al., "Recent Advances in Electron Tomography: TEM and HAADF-STEM Tomography for Materials Science and Semiconductor Applications", Microscopy and Microanalysis, vol. 11, pp. 378-400, 2005.
Kwak, Ja Hun et al., "Penta-coordinated Al3+ ions as preferential nucleation sites for BaO on $\gamma$-Al2O3: An ultra-highmagnetic field 27Al MAS NMR study", Journal of Catalysis, vol. 251, pp. 189-194, 2007.
Boettcher, Shannon W. et al., "Harnessing the Sol-Gel Process for the Assembly of Non-Silicate Mesostructured Oxide Materials", Accounts of Chemical Research, vol. 40, No. 9, pp. 784-792, 2007.

(56) References Cited

OTHER PUBLICATIONS

Zürner, Andreas et al., "Visualizing single-molecule diffusion in mesoporous materials", Nature, vol. 450, pp. 705-709, Nov. 29, 2007.
Iancu, Nora et al.,"Low-temperature synthetic method for size-controlled CdSe nanocrystals: utilization of boron selenide", Chem. Commun. 20, pp. 2298-2299, 2004.
Richards, Ryan et al., "Consolidation of Metal Oxide Nanocrystals. Reactive Pellets with Controllable Pore Structure That Represent a New Family of Porous, Inorganic Materials", Journal of American Chemical Society, vol. 122, No. 20, pp. 4921-4925, 2000.
Mulik, Sudhir et al., "Time-Efficient Acid-Catalyzed Synthesis of Resorcinol-Formaldehyde Aerogels", Chem. Mater., vol. 19, No. 25, pp. 6138-6144, 2007.
Villemin, Didier et al., "A one step process for grafting organic pendants on alumina via the reaction of alumina and phosphonate under microwave irradiation", Chem. Commun. 2001, pp. 2060-2061, 2001.
Laine et al. "Making Nanosized Oxide Powders From Precursors by Flame Spray Pyrolysis". Key Engr Matl. 159-160 pp. 17-24. 1999.
Schuyten et al. "A Novel Combustion Synthesis Preparation of CuO/ZnO/Zr02/Pd for Oxidative Hydrogen Production from Methanol" Catal Left (2008) 121:189-198.
T. Mahata, G. Das, R.K. Mishra, B.P. Sharma, Combustion synthesis of gadolinia doped ceria powder, Journal of Alloys and Compounds, vol. 391, Issues 1-2, Apr. 5, 2005, pp. 129-135.
Lee et al., "Recent Progress in the Synthesis of Porous Carbon Materials" Advanced Materials (Weinheim, Germany) (2006), 18(16), pp. 2073-2094.
Pek et al., "A thixotropic nancomposite gel for three-dimensional cell culture" Nature Nanotechnology (2008), 3(11), pp. 671-675.
Morris et al., "Silica Sol as a Nanoglue: Flexible Synthesis of Composite Aerogels" Science (Washington, D.C.) 1999, 284, (5414), pp. 622-624.
PCT Examiner, Lee, Young Wan, International Search Report and Written Opinion of International Application No. PCT/US2010/052276 mailed Jun. 27, 2011, 11 pages.
PCT Officer, Nora Linder, International Preliminary Report on Patentability of International Application No. PCT/US2010/052276 mailed Apr. 17, 2012, 7 pages.
Aguado-Serrano et al., "Silica/C composites prepared by the sol-gel method. Influence of the synthesis parameters on textural characteristics", Microporous and Mesoporous Materials. 74, pp. 111-119 (2004).
Aguado-Serrano et al., "Surface and catalytic properties of acid metal-carbons prepared by the sol-gel method", Applied Surface Science. 252, pp. 6075-6079 (2006).
Boffa et al., "Preparation of templated mesoporous silica membranes on macroporous a-alumina supports via direct coating of thixotropic polymeric sols", Microporous and Mesoporous Materials. 100, pp. 173-182 (2007).
Bruno et al., "Characterization of monolithic porous carbon prepared from resorcinol/formaldehyde gels with cationic surfactant", Colloids and Surfaces A: Physicochemical and Engineering Aspects. 358, pp. 13-30 (2010).
Capadona et al., "A versatile approach for the processing of polymer nanocomposites with selfassembled nanofibre templates", Nature Nanotechnology. 2, pp. 765-769 (2007).
Han et al., "The effect of silica template structure on the pore structure of mesoporous carbons", School of Chemical Engineering, Seoul National University, Carbon. 41, pp. 1049-1056 (2003).
Leventis et al., "One-Pot Synthesis of Interpenetrating Inorganic/Organic Networks of CuO/Resorcinol-Formaldehyde Aerogels: Nanostructured Energetic Materials", J. Am. Chem. Soc. 131, pp. 4576-4577 (2009).
Moreno-Castilla et al., "Synthesis and surface characteristics of silica- and alumina-carbon composite xerogels", Phys. Chem. Chem. Phys. 2, pp. 4818-4822 (2000).
Authorized Officer Tae Kwang Jung, International Search Report and Written Opinion dated Apr. 6, 2012 for PCT Application No. PCT/US2011/046381, 11 pages.
Capadona et al., "X-Aerogel Processing Time Reduced by One-Pot Synthesis" http://www.grc.nasa.gov/WWW/RT/2006/RX/RX20P-capadonal.html, downloaded on Jul. 26, 2013, 4 pages.
PCT Officer Bong Ho Chang, International Search Report and Written Opinion of International Application No. PCT/US2012/056552, mailed Mar. 28, 2013, 13 pages.
Joseph Davidovits, Geopolymer Chemistry and Applications, 3rd Edition, Jul. 2011, pp. 1-33.
PCT Officer Yukari Nakamura, International Preliminary Report on Patentability of International Application No. PCT/US2012/056522, mailed Apr. 3, 2014, 8 pages.
PCT Officer Lee W. Young, International Search Report and Written Opinion of International Application No. PCT/US2014/042053, mailed Feb. 24, 2015, 16 pages.
C. H. Christensen et al., "Mesoporous zeolite single crystal catalysts: Diffusion and catalysis in hierarchical zeolites" Catalysis Today 128, 2007, pp. 117-122.
N.-L. Michels et al., "Hierarchically Structured Zeolite Bodies: Assembling Micro-, Meso-, and Macroporosity Levels in Complex Materials with Enhanced Properties" Adv. Funct. Mater. 22, 2012, pp. 2509-2518.
D. P. Serrano et al., "Synthesis strategies in the search for hierarchical zeolites" Chemical Society Reviews 42, 2013, pp. 4004-4035.
L. Gueudre et al, "Diffusion in zeolites: is surface resistance a critical parameter?" Adsorption 16, 2010, pp. 17-27.
O. Cheung et al., "Adsorption kinetics for $CO_2$ on highly selective zeolites NaKA and nano-NaKA" Applied Energy 112, 2013, pp. 1326-1336.
A. L. Mayers et al., "Thermodynamics of Mixed-Gas Adsorption" A.I.Ch.E. Journal, vol. 11, No. 1, Jan. 1965, pp. 121-127.
O. Cheung et al., "Silicoaluminophosphates as $CO_2$ sorbents" Microporous Mesoporous Materials 156, 2012, pp. 90-96.
J. Aleman et al., "Definitions of Terms Relating to the Structure and Processing of Sols, Gels, Networks, and Inorganic-Organic Hybrid Materials," Pure and Applied Chemistry, vol. 79, No. 1, 2007, pp. 1801-1829.
Robert L. Burwell, Jr. "Manual of Symbols and Terminology for Physicochemical Quantities and Units—Appendix II. Definitions, Terminology and Symbols in Colloid and Surface Chemistry. Part II: Heterogeneous Catalysis," Pure and Applied Chemistry, vol. 46, 1976, pp. 71-90.
Gresham, Dr. Robert M., contributing editor, "Viscosity: A fluid's resistance to flow," Tribology & Lubrication Technology, Nov. 2008, pp. 55-57.
Le-Ping L et al, "Preparation phosphoric acid-based porous geopolymers," Applied Clay Science, vol. 50, No. 4, Dec. 1, 2010, pp. 600-603.

\* cited by examiner

POROUS GEOPOLYMER MATERIALS

CROSS-REFERENCE TO RELATED APPLICATIONS

This application is a U.S. National Phase Application of International Patent Application No. PCT/US2010/058497 filed Dec. 1, 2010, which claims the benefit of U.S. Patent Application Ser. No. 61/265,646 filed on Dec. 1, 2009, both of which are incorporated herein by reference in their entirety.

TECHNICAL FIELD

This invention relates to porous materials based on geopolymers and composites formed therefrom.

BACKGROUND

Geopolymers are commonly referred to as low-temperature aluminosilicate glass, alkali-activated cement, geocement, alkali-bonded ceramic, inorganic polymer concrete, and hydroceramic. These terms describe materials synthesized utilizing processes that can be described as a complex system of coupled alkali-mediated dissolution and precipitation reactions of aluminosilicates in an aqueous reaction substrate. Other metal-oxide based geopolymers include phosphate geopolymers and silico-phosphate geopolymers which form through dissolution of metal oxide precursors via acid-base reactions and subsequent precipitation of phosphates or silico-phosphates. Depending on the raw material selection and processing conditions, geopolymers can exhibit a wide range of properties and characteristics, including high compressive strength, low shrinkage, fast or slow setting, acid resistance, fire resistance, and low thermal conductivity. However, geopolymers have been much less explored for chemical applications, such as catalysis and ion exchange.

SUMMARY

Porous geopolymer materials and composites formed therefrom are described. Implementations of systems and techniques relating to porous geopolymer materials and fabrication of such materials are described. Methods including phase separation between two different liquids to yield geopolymers with accessible (or open) pores are described. Porous composite materials including porous geopolymer materials are also described. In some cases, the porous composite materials include a geopolymer matrix having foreign materials in the solid matrix or in the pores. As described herein, the porous morphology of the geopolymer materials (e.g., pore size, pore connectivity) can be controlled by phase separation.

In one aspect, fabricating a porous material includes combining a geopolymer resin and a liquid to form a mixture. The mixture is solidified to form a solid embedded with the liquid. At least a portion of the liquid is removed from the solid to yield the porous material. In some cases, one or more additional components are combined with the geopolymer resin and the liquid to form the mixture.

In another aspect, fabricating a porous material includes mixing a geopolymer resin with a plurality of components including a liquid to form a homogenous mixture by visual observation. The mixture is solidified to form a solid embedded with the liquid. At least a portion of the liquid is removed from the solid to yield the porous material.

Implementations can include one or more of the following features. In some implementations, the liquid is a water-miscible liquid (e.g., glycerol, ethylene glycol, or polyols) that dissolves geopolymer precursors to a lesser extent than water. In some implementations, the liquid is a water-immiscible liquid (e.g., oil or organic solvents). In some cases, the liquid can be a mixture of a water-miscible liquid and a water-immiscible liquid. In some cases, a viscosity of the liquid exceeds the viscosity of water at room temperature. In some cases, the liquid can produce long-chain carboxylate anions (e.g., through saponification reactions) when it is in contact with a geopolymer resin. The long-chain carboxylate anions may act as surfactants which can influence the separation between the geopolymer resin phase and the liquid phase. In some cases (e.g., when the liquid is a petroleum-based oil such as paraffin oil (often called mineral oil) or an organic solvent such as hexane or toluene), the liquid does not undergo saponification reactions. In some implementations, the liquid can include an organic monomer, oligomer, macromer, or polymer.

In some implementations, the liquid is a multicomponent liquid. A multicomponent liquid can be provided by mixing multiple components and a liquid. In some cases, the addition of the multiple components can be carried out after mixing the geopolymer resin and the liquid. Examples of a component of the multiple components include one or more monomers, oligomers, macromers, polymers, surfactants, metals, semiconductors, insulators, nanoparticles, nanomaterials, inorganic particles, organic particles, inorganic compounds, organic compounds, solvated molecules, organic solvents, emulsions, fibers, foams, porous materials, biological materials, quantum dots, magnetic materials, and the like.

The mixture can exhibit a nanoscale (1-1000 nm), microscale (1-1000 μm) or milliscale (1-10 mm) phase separation. In some cases, the mixture has a phase separated composition including a geopolymer-resin-rich phase and geopolymer-resin-poor phase. In some cases, the phase separated composition has a bi-continuous phase separation between a geopolymer-resin-rich phase and geopolymer-resin-poor phase, or a discontinuous phase separation between a geopolymer-resin-rich phase and geopolymer-resin-poor phase. As used herein, the term "bi-continuous" refers to a morphology having two continuous interwoven interfaces. Thus, a "bi-continuous phase separated composition" denotes two continuous interwoven phases, each including a chemically distinct material. Similarly, a porous material having a "bi-continuous morphology" has a continuous solid matrix interwoven with continuous voids or pores that afford an interconnected pore network.

In some implementations, the geopolymer resin is prepared by coupled alkali-mediated dissolution and precipitation reactions of silicate or aluminosilicate precursors in an aqueous reaction substrate. In other implementations, a geopolymer resin is formed through dissolution of metal oxide precursors via acid-base reactions and subsequent precipitations of phosphates or silico-phosphates. The geopolymer resin can include one or more oxides or hydroxides of aluminum, silicon, alkali metals, or hydrates thereof and/or one or more oxides or hydroxides of phosphorous, silicon, alkaline-earth metals, or hydrates thereof and/or organosilane, phosphoric acid, a phosphate, a hydrophosphate, an organophosphine oxide, or a combination thereof. Some implementations further include forming the geopolymer resin by combining one or more inorganic materials selected from the group consisting of fumed silica, rice husk ash, silica fume, silicates, aluminates, aluminosilicates, organosilanes, clays, minerals, metakaolin, calcined clays, fly ash, slag, pozzolan, incinerated utility waste, glass powder, and red mud with an alkaline or basic solution. In some implementations, the geopolymer resin includes one or more metals selected from the group consisting of Li, Na, K, Rb, Cs, Be, Mg, Ca, Sr, Ba, Ra, B, Al, Ga, In, Tl, Si, Ge, Sn, Pb, P, As, Sb, Bi, S, Se, Te, Po, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Sc, Y, Lu, La, Ce, Pr, Nd, Sm, Eu, Gd, Tb, Dy, Ho, Er, Tm, Yb, Th, U, and Pu.

The one or more additional components or one or more components of the plurality of components can be independently selected from the group consisting of metals, metalloids, conductors, semiconductors, insulators, metal oxides, metal hydroxides, inorganic salts, carbon materials, carbonaceous materials, nanoparticles, nanowires, inorganic particles, organic particles, inorganic compounds, organosilanes, organosiloxanes, organoalumoxanes, organo metal oxides, organometallic complexes, organic compounds, monomers, oligomers, macromers, polymers, solvated molecules, surfactants, organic solvents, microemulsions, nanoemulsions, emulsions, fibers, foams, gases, foaming materials, porous materials, mineral materials, biological materials, quantum dots, and magnetic materials. Other examples of components include materials that generate gas when in contact with geopolymer resin, such as hydrogen peroxide, aluminum metal, or silica fume.

The water-immiscible liquid can include one or more oils produced from one or more agricultural or aquacultural sources, one or more oils produced from one or more geological sources, one or more oils produced from one or more industrial sources, or one or more oils produced from one or more industrial or household wastes. The water-immiscible liquid can include esters of long-chain carboxylic acids; one or more triglycerides, diglycerides, or monoglycerides; one or more plant oils, straight vegetable oils, or waste vegetable oils; at least one of canola oil, corn oil, castor oil, soybean oil, cottonseed oil, linseed oil, sunflower oil, palm oil, and algae oil; an animal fat; or biodiesel.

In some implementations, mixing includes stirring, shaking, shearing, agitating, sonicating, or vibrating the mixture at atmospheric pressure, a pressure higher than atmospheric pressure, or a pressure lower than atmospheric pressure. Solidifying can include curing the mixture at ambient temperature or by heating below the boiling point of the liquid; heating the mixture under a controlled humidity; stirring, shaking, shearing, agitating, sonicating, or vibrating the mixture; spinning, spreading, screeding, spraying, dispensing, injecting, foaming, shaping, molding, ribboning, extruding, or pultruding the mixture; spinning, spreading, screeding, spraying, dispensing, injecting, foaming, shaping, molding, ribboning, extruding, or pultruding the mixture and heating the mixture during at least part of the time during spinning, spreading, screeding, spraying, dispensing, injecting, foaming, shaping, molding, ribboning, extruding, or pultruding.

In some implementations, removing at least a portion of the liquid or the water-miscible liquid from the solid includes extraction of the liquid; soaking the solid in one or more solvents selected from the group consisting of water, tetrahydrofuran, hexane, acetonitrile, dimethyl sulfoxide, a hydrocarbon, a halogenated hydrocarbon, a ketone, an aldehyde, an amine, an amide, an ether, an ester, a carboxylic acid and an alcohol; or decomposition, evaporation, heating, pyrolysis, or combustion.

In some implementations, removing at least a portion of the liquid or the water-immiscible liquid from the solid includes extraction of the liquid; soaking the solid in one or more organic solvents selected from the group consisting of tetrahydrofuran, hexane, acetonitrile, dimethyl sulfoxide, a hydrocarbon, a halogenated hydrocarbon, a ketone, an aldehyde, an amine, an amide, an ether, an ester, a carboxylic acid, and an alcohol; or decomposition, evaporation, heating, pyrolysis, or combustion.

Pores defined by a porous geopolymer material include mesopores, with a pore size between about 2 nm and about 50 nm, and macropores, with a pore size greater than about 50 nm. Some porous geopolymer materials define a combination of mesopores and macropores. As used herein, a porous geopolymer material with a majority of mesopores or macropores refers to a porous geopolymer material with at least about 50%, at least about 75%, at least about 85%, at least about 95%, or at least about 99% of the pores having a pore size between about 2 nm and about 50 nm or greater than about 50 nm, respectively. In some cases, pores in a porous geopolymer material have a pore size between about 1 mm and about 10 mm. As used herein, "pore size" refers to a diameter or a distance between surfaces defining boundaries of a pore. In some cases, a significant majority of the pores in a porous geopolymer material (e.g., at least about 75%, at least about 85%, at least about 95%, or at least about 99%) are mesoporous or macroporous. The pores defined by the porous material may be interconnected or disconnected.

In some implementations, fabricating the porous material further includes removing a component from the porous material by a process including extraction, soaking, etching, melting, sublimation, dissolution, decomposition, evaporation, heating, combustion, or calcination, thereby forming another porous material. One or more components of the porous material can be replaced with a different component. In some cases, fabricating the porous material further includes hydrothermally heating the porous material and/or treating the porous material to impart a microporosity to the porous material and/or contacting the porous material with an additive to form a composite including the porous material and the additive and/or contacting the porous material with a gas or a liquid.

Preparing a porous material from a geopolymer can include treating a homogeneous portion of the geopolymer resin-liquid mixture so that it solidifies. The solidification can be achieved by leaving the mixture at an ambient temperature or by heating it at a temperature below the boiling point of the liquid component of the mixture.

The term "geopolymer blend" is used herein to describe the solidified homogeneous mixture or the solidified homogeneous portion of the mixture of a geopolymer resin and a liquid between which a nanoscale, microscale, or milliscale phase separation occurs. In some cases, the liquid component of the mixture may undergo polymerization during the treatment of the mixture (e.g., when the treatment involves heating). The geopolymer blend can be in various forms including monoliths, sheets, coatings, membranes, films, fibers, wires, beads, pellets, rings, particulates, nanoparticles, and the like.

In another aspect, preparing porous materials from geopolymers includes treating the geopolymer blend so that a significant portion of the liquid component of the geopolymer blend is removed to provide a porous material. Examples of the treatment include extraction, soaking, decomposition, evaporation, pyrolysis, calcination and the like. In some implementations, heating of the blend can cause dehydration, decomposition, or crystallization of the geopolymer blend.

In some implementations, the geopolymer blend can include multiple components. In some cases, the inclusion of the multiple components can be achieved by employing a multicomponent geopolymer resin. In some cases, the inclusion of the multiple components can be achieved by employing a multicomponent liquid. In other cases, the inclusion of the multiple components can be achieved by mixing one or more additional components into the mixture of a geopolymer resin and a liquid. The porous materials formed from the process described herein can include a phosphate geopolymer, an aluminosilicate geopolymer, or a silico-phosphate geopolymer.

The porous materials formed from geopolymer materials can be treated to further change the characteristics of pores and/or pore walls. In certain implementations, the porous materials are treated to remove one of the multiple components and thus to produce another porous material. Examples of the treatment include extraction, soaking, etching, melting, sublimation, dissolution, decomposition, evaporation, heating, combustion, calcination, and the like. In some implementations, the heating of the porous materials can cause dehydration, decomposition, combustion, or crystallization of the materials. In some cases, the heating of the porous materials can cause a portion (e.g., a significant portion) of the pores to be closed and inaccessible. In some cases, the process involves treating the material to replace one component through ion exchange, metatheses and the like. In some cases, the process involves treating the material to introduce a crystallinity to the pore walls. In other cases, the process involves treating the material to introduce a microporosity to the pore walls.

The porous materials formed from geopolymer can be treated to further form a composite material. In some implementations, the porous material is contacted with an additive to form a composite including the porous material and the additive. In some cases, the additive binds to the porous material. In some implementations, the material is impregnated with nanoparticles, nanomaterials, inorganic particulates, organic particulates, inorganic compounds, organic compounds, biological materials, polymers, carbon, metals, and the like. In other implementations, the material is filled with a gas, a liquid or a solid.

The composite can be treated further to form another material. In some cases, treating the composite includes heating the composite. In some cases, the heating can cause the pores on the outer region of the materials to collapse or become blocked so that the pores in the inner region become inaccessible. Some implementations include contacting the composite with a solvent to etch the composite.

Thus, particular embodiments have been described. Variations, modifications, and enhancements of the described embodiments and other embodiments can be made based on what is described and illustrated. In addition, one or more features of one or more embodiments may be combined. The details of one or more implementations and various features and aspects are set forth in the accompanying drawings, the description, and the claims below.

DETAILED DESCRIPTION

Figure 1A:
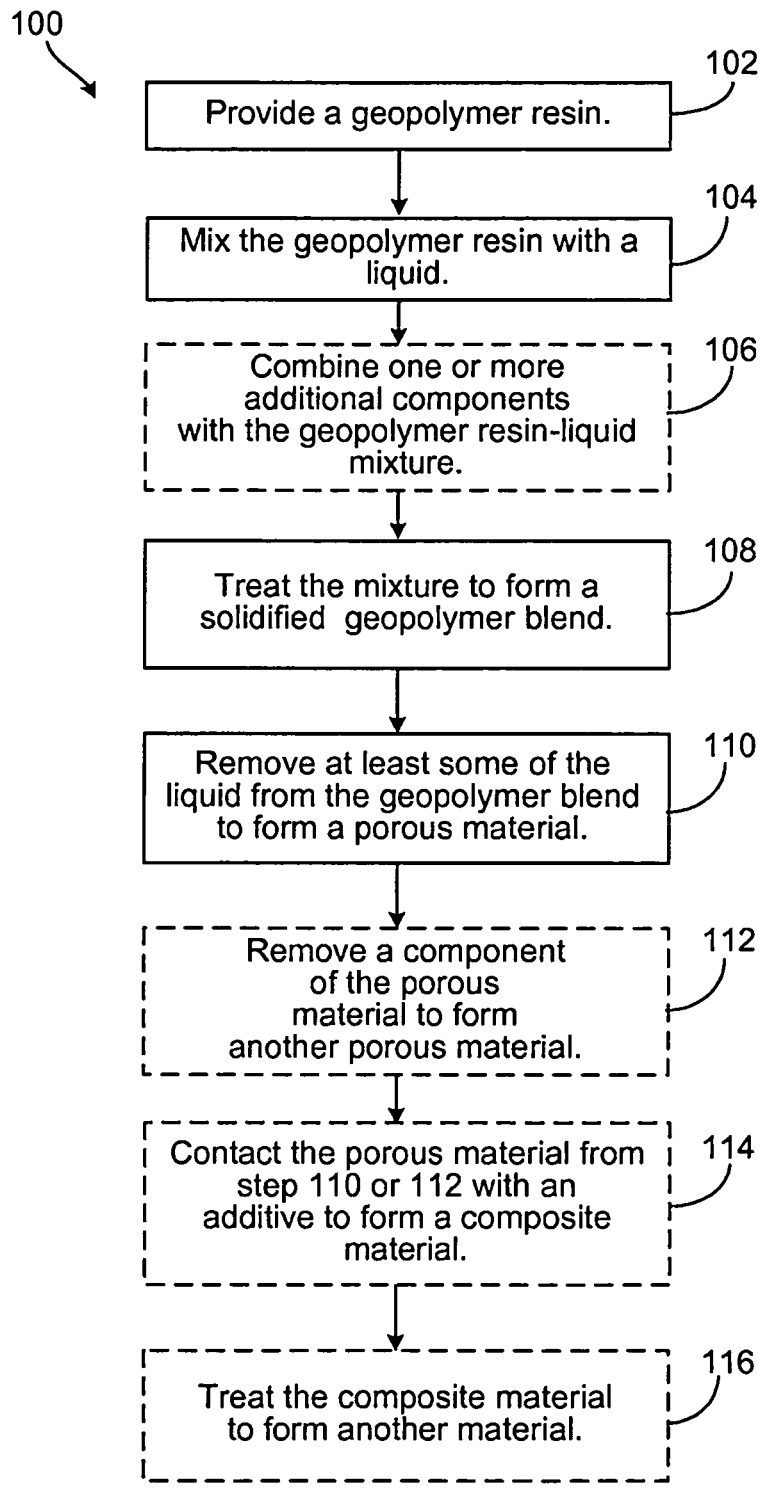
FIG. 1A is a flowchart of an exemplary process for forming a porous geopolymer material.

Methods for fabricating porous geopolymer materials are described. Other porous materials (e.g., composites) formed from the porous geopolymer materials are also described. Pores defined by the porous geopolymer materials can include micropores (i.e., pores with a pore size less than about 2 nm), mesopores (i.e., pores with a pore size between about 2 nm and about 50 nm), macropores (i.e., pores with a pore size greater than about 50 nm), or any combination thereof. In some cases, pores defined by the porous materials include a majority or a significant majority of mesopores or open mesopores. In some cases, pores defined by the porous materials include a majority or a significant majority of macropores or open macropores. In certain cases, pores defined by the porous materials include mesopores and macropores. The composite materials can include a geopolymer matrix having foreign materials in the solid matrix or in the pores. As described herein, the porous morphology of geopolymer materials can be controlled by phase separation to yield porous geopolymer materials or materials derived therefrom with controlled porosity with respect to pore size, connectivity of pores (e.g., open or closed pores), and the like.

Various methods can be used to control the porosity of inorganic materials. Porous materials having a pore distribution on a nanometer or micrometer scale can be synthesized by a nano-template method, a solvent removal method, or a phase separation method.

In the nano-template method, nano-sized sacrificial templates can be mixed into a liquid body of a precursor that polymerizes to form a solid. The templates can then be removed to leave pore space in the solid body. The templates can be organic polymers, self-assemblies of surfactants, or other particulate matter.

In the solvent removal method, a wet gel can be formed when a gel precursor and a gelation agent are mixed with a solvent. The solvent can be removed (e.g., by drying), leaving connected pores in the final solid product. In some cases, a wet gel can be prepared by mixing two or more different gel precursors and a gelation agent in a solvent. Drying the solvent can provide a porous composite material made of different compounds. The porosities and the pore morphologies of the resulting materials can be affected by the liquid removal methods which can include heating, ambient drying, supercritical drying, cryogenic drying, and the like. As used herein, "ambient" conditions, such as ambient temperature or pressure, refers to room temperature or atmospheric pressure, respectively. Room temperature can be, for example, between about 15° C. and about 25° C. Unless otherwise stated, processes described herein and properties of substances described herein (e.g., viscosity), are understood to be under conditions of ambient temperature and atmospheric pressure.

In the phase separation method, a soluble (or miscible) organic polymer, such as poly(ethylene oxide) (PEO), can first be mixed into a gel precursor solution. When the gelation takes place in the solution, the polymerization and gel-forming reaction can cause a phase separation between the organic polymers and the gel networks. In an alkoxy-derived sol-gel system, various macroporous morphologies can be obtained by inducing the phase separation parallel to the sol-gel transition and then by removing the organic polymer phase by dissolution or calcination. This method provides macroporous metal-oxide materials. The phase separation can be bi-continuous and thus the macroporous metal-oxide materials can have a bi-continuous morphology.

For geopolymers, one method of controlling porosity, with a significant majority of the pores in the nanometer ranges, is based on control of the precursor ratios (see, for example, U.S. Patent Publication No. 2010/0222204, entitled "Method of preparing a controlled porosity geopolymer, the resulting geopolymer and the various applications thereof" and W. M. Kriven et al., "Microstructure and nanoporosity of as-set geopolymers" Ceramic Engineering and Science Proceedings 2007, 27, 491, both of which are incorporated by reference herein). Macropores can be introduced to geopolymers with gas-forming agents (see, for example, W. M. Kriven et al., "Nano- and Microporosity in Geopolymer Gels" Microscopy and Microanalysis 2006, 12 (Supp 2), 552 CD, which is incorporated by reference herein) or sacrificial templates such as wax particles (see, for example, W. M. Kriven et al., "Geopolymers: Alkali Bonded Ceramics (ABC's) for High Tech Applications," an invited lecture presented at the 107th Annual meeting of The American Ceramic Society, held in Baltimore, Md., Apr. 10-13, 2005).

Referring to FIG. 1A, a process for preparing porous materials 100 includes providing a geopolymer resin in step 102. The geopolymer resin can be prepared through a geopolymerization process. As used herein, "geopolymerization process" refers to a process that yields a geopolymer. In some implementations, a geopolymer resin can be prepared by coupled alkali-mediated dissolution and precipitation reactions of silicate or aluminosilicate precursors in an aqueous reaction substrate. As used herein, "geopolymer resin" refers to a liquid that is prepared prior to solidification in a geopolymerization process. A geopolymer resin can contain a large amount of water and dissolved inorganic species, and can be solidified at an ambient temperature (e.g., 15-25° C.) or at an elevated temperature (e.g., 40-80° C.). In some implementations, a geopolymer resin can be also prepared through dissolution of metal oxide precursors via acid-base reactions and subsequent precipitations of phosphates or silico-phosphates. The source of silicon in geopolymers includes fumed silica, rice husk ash, silica fume, silicates, aluminates, aluminosilicates, organosilanes, clays, minerals, metakaolin, calcined clays, fly ash, slag, pozzolan, incinerated utility waste, glass powder, red mud, and the like. The source of aluminum in geopolymers includes alumina, aluminum salts, organoalumoxanes, clays, minerals, metakaolin, calcined clays, fly ash, slag, pozzolan, incinerated utility waste, glass powder, red mud, and the like. The source of phosphorous includes phosphoric acid, phosphates, hydrophosphates, organophosphine oxide, and the like. In some implementations, the geopolymer resin can include one or more metals such as Li, Na, K, Rb, Cs, Be, Mg, Ca, Sr, Ba, Ra, B, Al, Ga, In, Tl, Si, Ge, Sn, Pb, P, As, Sb, Bi, S, Se, Te, Po, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Sc, Y, Lu, La, Ce, Pr, Nd, Sm, Eu, Gd, Tb, Dy, Ho, Er, Tm, Yb, Th, U, Pu or any combination thereof. The preparation of geopolymer resins is described, for example, in W. M. Kriven, "Inorganic Polysialates or 'Geopolymers'," American Ceramic Society Bulletin, 2010, 89, 31; A. S. Wagh, "Chemically Bonded Phosphate Ceramics—A Novel Class of Geopolymers," Ceramic Transactions 2005, 165, 101; and Chapter 1 of *Geopolymer: Chemistry and Applications*" by Joseph Davidovits, all of which are incorporated by reference herein.

A multicomponent geopolymer resin can be prepared by the addition of multiple components to a geopolymer resin. These components can remain in the geopolymer matrix after solidification of the geopolymer resin. Multicomponent geopolymer resins are described in U.S. Pat. No. 5,244,726 and U.S. Pat. No. 7,771,686, which are both incorporated by reference herein. Examples of components of multicomponent geopolymer resin include nanoparticles, nanomaterials, inorganic particulates, organic particulates, biological materials, or any combination thereof. Other examples include water-miscible organic monomers, oligomers, macromers, polymers; compounds that can be hydrolyzed and condensed with a geopolymer resin, such as organosilanes, organosiloxanes, organoalumoxanes, and organo metal oxides; inorganic compounds such as water-soluble organometallic complexes and inorganic metal compounds; water-miscible liquids such as glycerol, alcohols, acetone, tetrahydrofuran, dimethyl sulfoxide and N-methylpyrrolidone; and materials that generate gas when in contact with geopolymer resin, such as hydrogen peroxide, aluminum metal or silica fume.

The geopolymer resin of step 102 is mixed with a liquid in step 104. The liquid is chosen such that at least a portion of its mixture with a geopolymer resin is homogeneous upon visual inspection, but exhibits a nanoscale (1-1000 nm), microscale (1-1000 µm) or milliscale (1-10 mm) phase separation similar, for example, to some microemulsions, nanoemulsions, emulsions, double emulsions, and polymer blends. In some cases, the liquid of step 104 used to prepare the geopolymer resin is more viscous than water. In some cases, the liquid is a water-miscible liquid that dissolves geopolymer precursors to a lesser extent than water. Examples of the liquid include glycerol (or commercially called as glycerin) ethylene glycol and polyols. In some cases, the phase separation occurs between geopolymer-resin-rich regions and geopolymer-resin-poor regions. The phase separation can be bi-continuous, such that the mixture of the geopolymer resin and the liquid has a bi-continuous phase-separated composition, including a geopolymer-resin-rich phase and a geopolymer-resin-poor phase. The bi-continuous phase separation can occur on a nanoscale, a microscale, a milliscale or a combination thereof. In some cases, the phase separation can be discontinuous between a geopolymer-resin-rich phase and a geopolymer-resin-poor phase. The discontinuous phase separation can occur on a nanoscale, a microscale, a milliscale or a combination thereof.

Examples of liquids that phase-separate with a geopolymer resin include water-immiscible liquids. The water-immiscible liquids can include biorenewable oils such as plant oil, straight vegetable oil, and waste vegetable oil that contain triglycerides. Some examples of suitable plant and vegetable oils include canola oil, castor oil, palm oil, soybean oil, linseed oil, corn oil, sunflower oil, cottonseed oil, and algae oil. Water-immiscible liquids also include animal fats such as lards and tallows that contain triglycerides. When triglycerides are in contact with a geopolymer resin, the triglycerides can undergo saponification reactions by reacting with the alkaline or basic component in the geopolymer resin. The saponification reactions generate long-chain carboxylate anions. In some cases, the long-chain carboxylate anions act as surfactants and thereby influence the separation between the geopolymer resin phase and the water-immiscible liquid phase. The water-immiscible liquids can also include other components capable of undergoing saponification reactions, including biodiesel, monoglycerides, and diglycerides.

In some embodiments, the water-immiscible liquid does not undergo a saponification reaction. Examples of such liquids include petroleum-based oil such as paraffin oil (often called mineral oil) or water-immiscible organic solvents such as hexane or toluene. In some cases, the water-immiscible liquid includes an organic monomer, oligomer, macromer, or polymer. In some cases, the liquid can be a mixture of a water-miscible liquid and a water-immiscible liquid.

The liquid of step 104 can be a multicomponent liquid. In some cases, a multicomponent liquid is formed by adding multiple components to the liquid. The multicomponent liquid is then mixed with the geopolymer resin. In certain cases, the geopolymer resin and the liquid are combined first, and one or more additional components are added to the geopolymer resin-liquid mixture, as shown in optional step 106.

Components of multicomponent liquids can include one or more monomers, oligomers, macromers, polymers, metals, semiconductors, insulators, nanoparticles, nanomaterials, inorganic particles, organic particles, inorganic compounds, organic compounds, solvated molecules, surfactants, organic solvents, emulsions, fibers, foams, gases, foaming materials, porous materials, biological materials, quantum dots, magnetic materials, and the like.

The mixture of step 104 or 106 is then treated so that the geopolymer resin component in the mixture hardens or solidifies in step 108. The hardened or solidified mixture is called a geopolymer blend. The treatment can include heating the mixture at relatively low temperatures (e.g., between about 40° C. and about 80° C.). Solidification can be achieved by heating the mixture at a temperature below the boiling point of the liquid component of the mixture, exposing the mixture to electromagnetic radiation (e.g., microwave or infrared radiation), or allowing the resin to cure at an ambient temperature (e.g., room temperature).

In some implementations, the treatment of step 108 is carried out in the presence of stirring, shaking, shearing, agitation, sonication, vibration, or the like; by heating under a controlled humidity; or with spinning, spreading, screeding, spraying, dispensing, injecting, foaming, shaping, molding, ribboning, extruding or pultruding the mixture, all with or without simultaneous heating. In some cases, the liquid component of the mixture undergoes polymerization during the treatment of the mixture (e.g., when the treatment involves heating). The geopolymer blend can be in various forms including monoliths, sheets, coatings, membranes, films, fibers, wires, beads, pellets, rings, particulates, nanoparticles, and the like.

The geopolymer blend may include multiple components. In some cases, the inclusion of multiple components can be achieved by employing a multicomponent geopolymer resin, a multicomponent liquid, or a combination thereof. In certain cases, the inclusion of multiple components can be achieved by mixing multiple components into a mixture of a geopolymer resin and a liquid.

The geopolymer blend of step 108 is treated to remove at least some or a significant portion of the liquid component to provide a porous material in step 110. Examples of the treatment include extraction, soaking, decomposition, evaporation, heating, pyrolysis, combustion, and the like. The extraction or soaking can be achieved by using one or more solvents selected from the group consisting of water, tetrahydrofuran, hexane, acetonitrile, dimethyl sulfoxide, a hydrocarbon, a halogenated hydrocarbon, a ketone, an aldehyde, an amine, an amide, an ether, an ester, a carboxylic acid and an alcohol. Heating of the blend may result in dehydration, decomposition, or crystallization of the geopolymer blend. The porous material can be in various forms including monoliths, sheets, coatings, membranes, films, fibers, wires, beads, pellets, rings, particulates, nanoparticles, biological materials, and the like.

Optional step 112 includes processing the product of step 110 (e.g., to change characteristics of the pores and/or pore walls). In some cases, the process involves treating the porous material to remove a component. Examples of the treatment include extraction, soaking, etching, melting, sublimation, dissolution, decomposition, evaporation, heating, combustion, calcination, and the like. In some cases, heating of the porous materials can cause dehydration, decomposition, combustion, or crystallization of the porous materials. In some cases, the heating of the porous materials can cause at least a portion of the pores to be closed and inaccessible. In some cases, step 112 includes treating the material to replace one or more components. Examples of the treatment include ion exchange, metatheses, and the like. In some cases, the process includes treating the material with hydrothermal treatment, heating, calcination, and the like to introduce a crystallinity and/or a microporosity to the pore walls.

Optional step 114 includes processing the product of step 110 or step 112 to produce a composite material. In some implementations, the porous material of step 110 or step 112 is contacted with an additive to form a composite including the porous material and the additive. In some cases, the additive binds to the porous material. In certain cases, the material is impregnated with inorganic particulates, organic particulates, inorganic compounds, organic compounds, biological materials, polymers, carbon, metals, and the like. The material can be filled or partially filled with a gas, a liquid, a solid, or a combination thereof.

Optional step 116 includes processing the product of step 114 to produce another material. In some cases, the composite of step 114 can be modified in chemical composition, in chemical structure or in pore morphology. In some cases, the composite of step 114 can be treated by heating. Heating the composite can cause the pores on the outer region of the materials to collapse or become blocked so that the pores in the inner region become inaccessible. In some cases, the composite of step 114 can be contacted with a solvent to etch the composite.

Figure 1B:
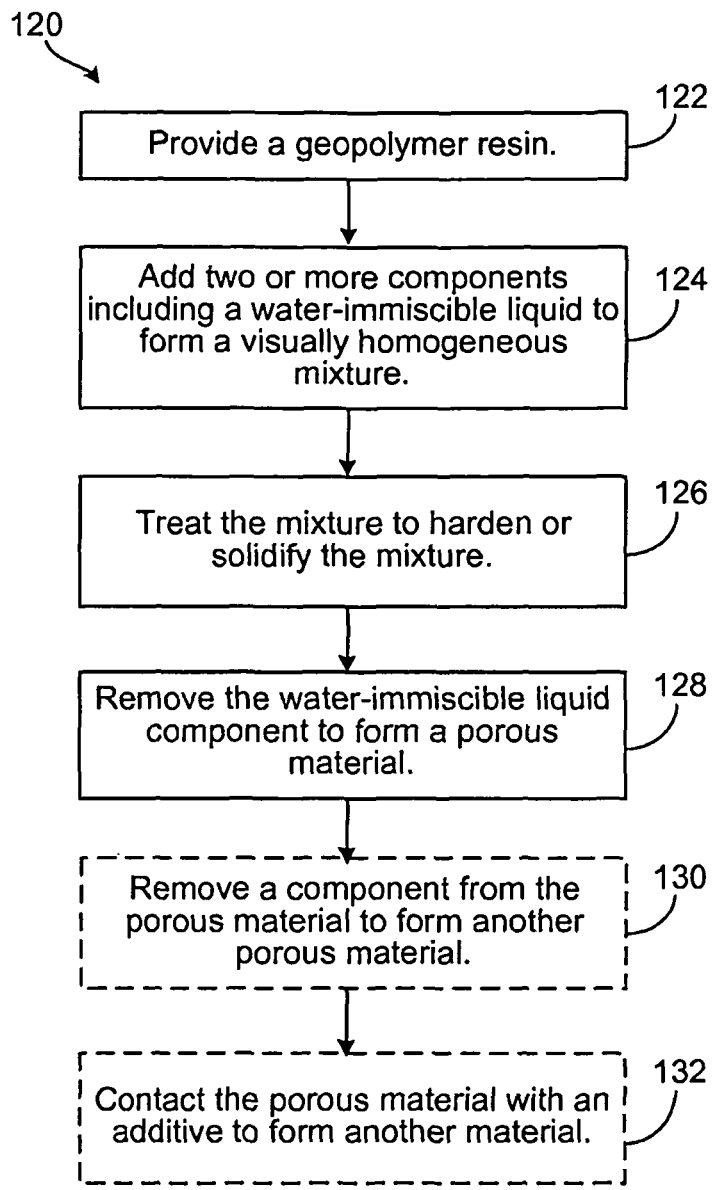
FIG. 1B is a flowchart of an exemplary process for forming a porous geopolymer material with a water-immiscible liquid.

Process 120, shown in FIG. 1B, is an example of process 100. In process 120, a geopolymer resin is provided in step 122. In step 124, two or more components, including a water-immiscible liquid, are combined with the geopolymer resin to form a visually homogenous mixture. The mixture is solidified or hardened in step 126, and the water-immiscible liquid component is removed from the solidified or hardened mixture to form a porous material in step 128. In optional step 130, one or more components of the porous material is removed, yielding another porous material. In optional step 132, the porous material formed in step 128 or 130 is contacted with an additive to form another material.

The porous materials, composites, and materials described herein can be used in a variety of ways including, but not limited to, as adsorbents, absorbents, nanoreactors, nanoglues, nanocontainers, nanocomposites, catalysts, catalyst supports, oxidizing agents, reducing agents, filters, chromatography media, ion exchange materials, separation materials, magnetic separation materials, membranes, gas/liquid/fuel storage materials, electrodes, sensors, electrical materials, electronic materials, magnetic materials, microwave absorbers, microwave-assisted heating materials, bio-implants, structure reinforcing materials, construction materials, solar energy collectors, supercapacitors, solar cell components, dielectrics, thermal insulation materials, sound insulation materials, fire retardants, paint thickeners, matting agent, packaging materials, refractories, additives, ink jet coatings, porous binders, porous fillers, ionic conductors, bioreactors, culture media, culture supports, bone replacement materials, active battery components, battery separators, thermal composites (e.g., porous geopolymers impregnated with a thermal energy storage material, a phase change compound, a thermochemical energy storage material, or a magnetocaloric material), toxin removal materials, chemical removal materials, waste removal materials, hazard removal materials, chemical decontaminants, bioactive decontaminants, odor elimination materials, oil spill cleanup materials, arsenic removal materials, heavy metal removal materials, nuclear waste removal materials, energetic materials, evaporative chillers/heaters, aroma delivery materials, flavor delivery materials, drug delivery materials, sanitizer delivery materials, herbicide delivery materials, fungicide delivery materials, pesticide delivery materials, insecticide delivery materials, plant nutrient delivery materials, fertilizer materials, plant growing media, green roof materials, hydroponics support media, potting materials, animal nutrient delivery materials, human nutrient delivery materials, water purification materials, soil stabilization materials, wetting agents, water absorption materials, water adsorption materials, water collection materials, water retention materials, humidity control material, pet litter absorption materials, vapor sorption materials, gas sorption materials, oil sorption material, oil extraction material, algae oil nanofarming material, selective solid-phase extraction material, desiccants, proppant materials, hemostats, and the like. The porous materials, composites, and materials described herein can be also used as a template or a mask to produce porous materials other than geopolymers, including porous polymers and porous ceramics.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLES

Example 1

Figure 2A:
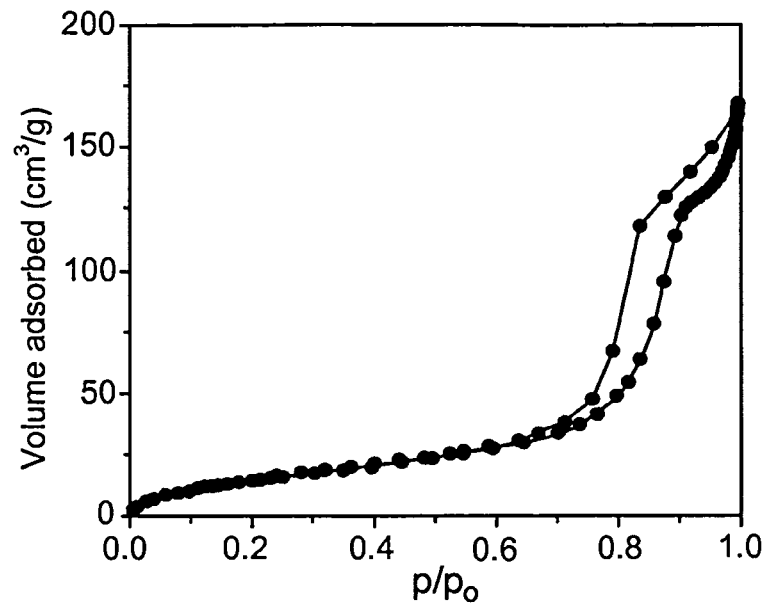
FIGS. 2A and 2B show a nitrogen sorption isotherm and pore size distribution of an example porous geopolymer material formed by mixing a geopolymer resin and corn oil (Example 1).
Figure 2B:
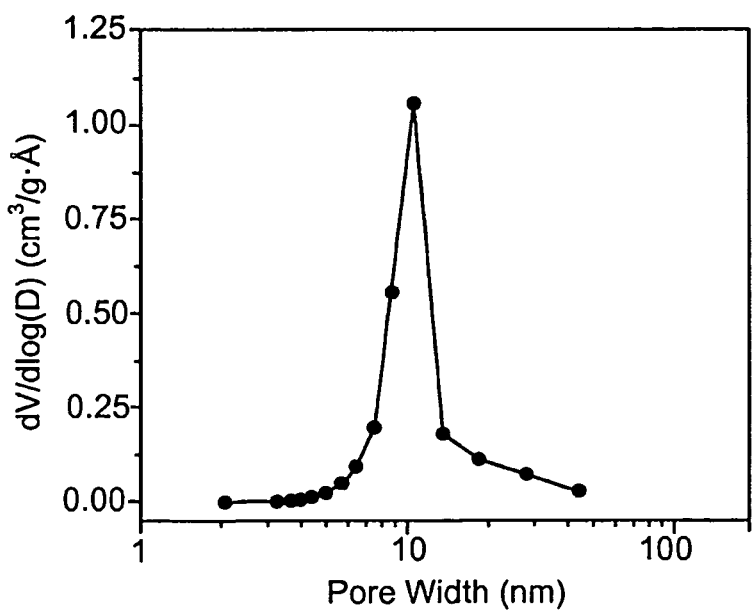

12.2 g of KOH was dissolved in 20 ml of water into which 6.7 g of fumed silica was added subsequently. The solution was stirred until it became homogeneous by visual observation. In the solution, 12.3 g of metakaolin was added and stirred until the solution became visually homogeneous. 20 ml of corn oil was then added to the geopolymer resin and stirred vigorously until the mixture became homogeneous by visual observation. The mixture was heated in a closed container at 40° C. for 24 hours, which resulted in a hard solid monolith. The monolith was immersed in a tetrahydrofuran (THF) bath to remove the oil from the monolith. The monolith was then removed from the bath and dried in a lab oven at 110° C. FIGS. 2A and 2B show a nitrogen sorption isotherm and Barret-Joyner-Halenda (BJH) pore size distribution of the product. The product showed a nitrogen Brunauer-Emmett-Teller (BET) surface area of about 59 $m^2/g$, a BJH desorption cumulative pore volume of about 0.25 $cm^3/g$, and a BJH desorption pore width of about 12.8 nm. Table 1 shows the surface areas and pore characteristics of this porous material and others prepared under the same conditions but with different oils.

TABLE 1

BET surface area, BJH pore volume and BJH average pore width of samples made from geopolymer resin that is mixed with various oils.

| Oil | BET surface area ($m^2/g$) | BJH pore volume ($cm^3/g$) | BJH pore width (nm) |
| --- | --- | --- | --- |
| canola oil | 77 | 0.38 | 14.7 |
| corn oil | 59 | 0.25 | 12.8 |
| olive oil | 60 | 0.23 | 11.3 |
| mineral oil | 19 | 0.08 | 13.4 |

Example 2

The porous material prepared with canola oil in Table 1 was subsequently calcined at 700° C. for 10 hours in air. The calcined product showed a surface area of about 28 m²/g, a pore volume of about 0.28 cm³/g, and an average pore width of about 42.1 nm.

Example 3

Figure 3A:
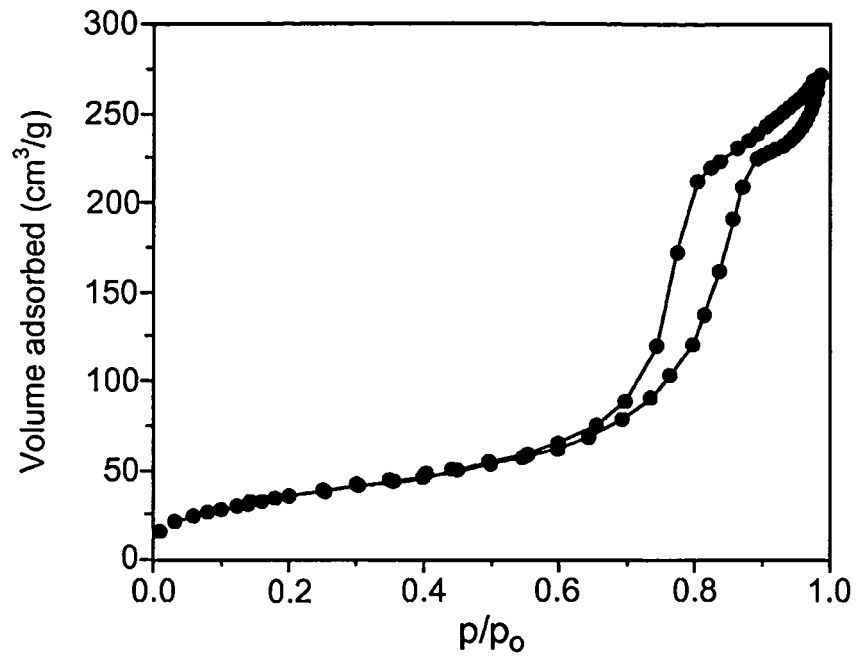
FIGS. 3A and 3B show a nitrogen sorption isotherm and pore size distribution of an example porous geopolymer material formed by mixing a geopolymer resin and canola oil under a lower pressure (Example 3).
Figure 3B:
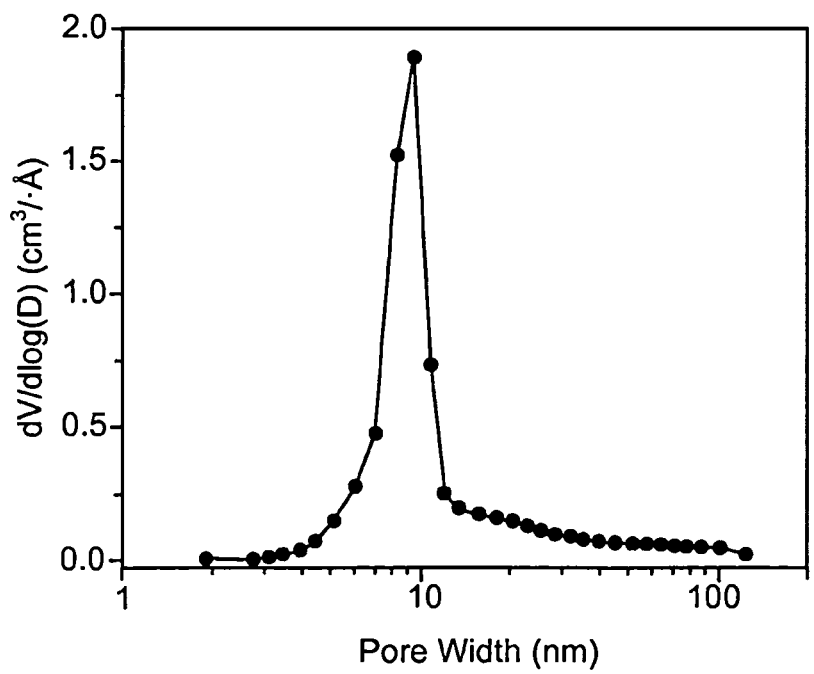
Figure 3C:
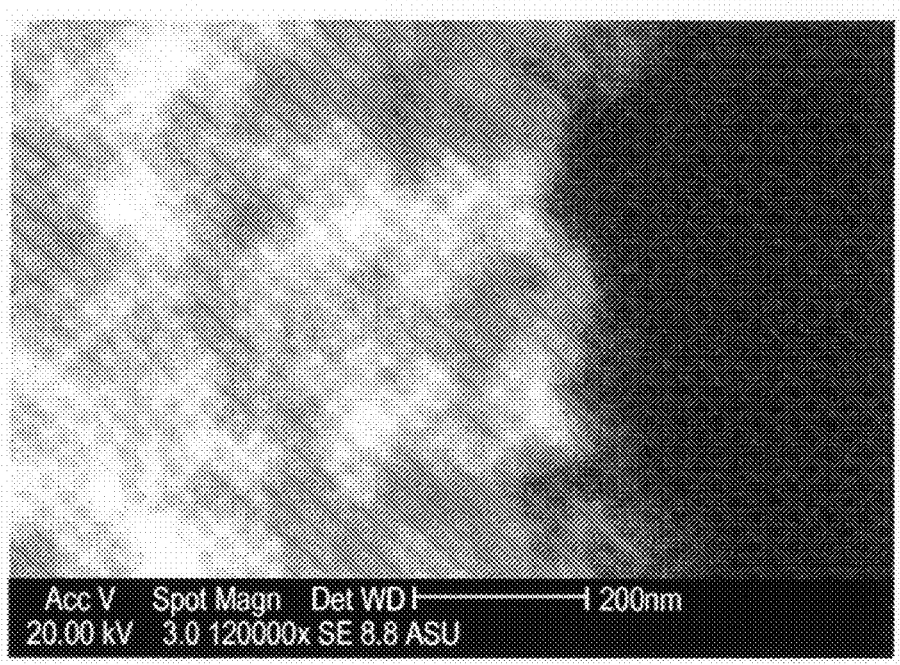
FIGS. 3C and 3D show a scanning electron microscope (SEM) image and an atomic force microscope (AFM) image of the sample.
Figure 3D:
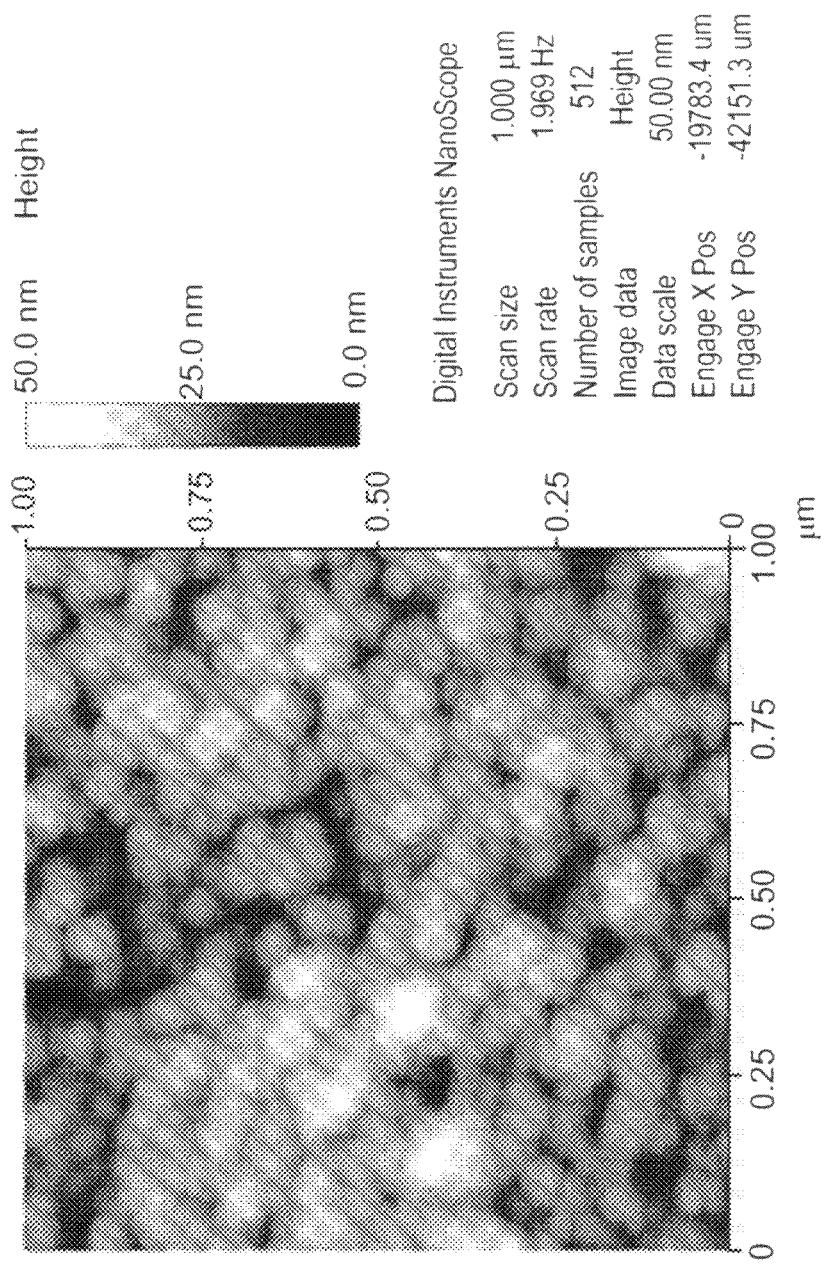

12.2 g of KOH was dissolved in 20 ml of water into which 6.7 g of fumed silica was added subsequently. The solution was stirred until it became homogeneous by visual observation. In the solution, 12.3 g of metakaolin was added and stirred until the solution became visually homogeneous. 20 ml of canola oil was then added into the geopolymer resin and stirred vigorously under a slight vacuum until the mixture became homogeneous by visual observation. The mixture was heated in a closed container at 40° C. for 24 hours, which resulted in a hard solid monolith. The resulting sample showed a BET surface area of about 132 m²/g, a BJH desorption cumulative pore volume of about 0.42 cm³/g, and a BJH desorption pore width of about 10.3 nm. FIGS. 3A and 3B show a nitrogen sorption isotherm and BJH pore size distribution of the product. FIGS. 3C and 3D show a scanning electron microscope (SEM) image and an atomic force microscope (AFM) image of the product.

Example 4

12.2 g of KOH was dissolved in 20 ml of water into which 13.3 g of fumed silica was added subsequently. The solution was then stirred until it became visually homogeneous. In the solution, 24.7 g of metakaolin was added and stirred until the solution became homogeneous by visual observation. 20 ml of canola oil was then added into the geopolymer resin and stirred vigorously until the mixture became visually homogeneous. The mixture was heated in a closed container at 40° C. for 24 hours, which resulted in a hard solid monolith. The monolith was then immersed in a THF bath to remove the oil from the monolith. The product showed a BET surface area of about 54 m²/g, a BJH desorption cumulative pore volume of about 0.19 cm³/g, and a BJH desorption pore width of about 10.8 nm.

Example 5

The sample in Example 4 was calcined at 700° C. for 10 hours. The product showed a BET surface area of about 76 m²/g, a BJH desorption cumulative pore volume of about 0.24 cm³/g, and a BJH desorption pore width of about 8.1 nm.

Example 6

Figure 4A:
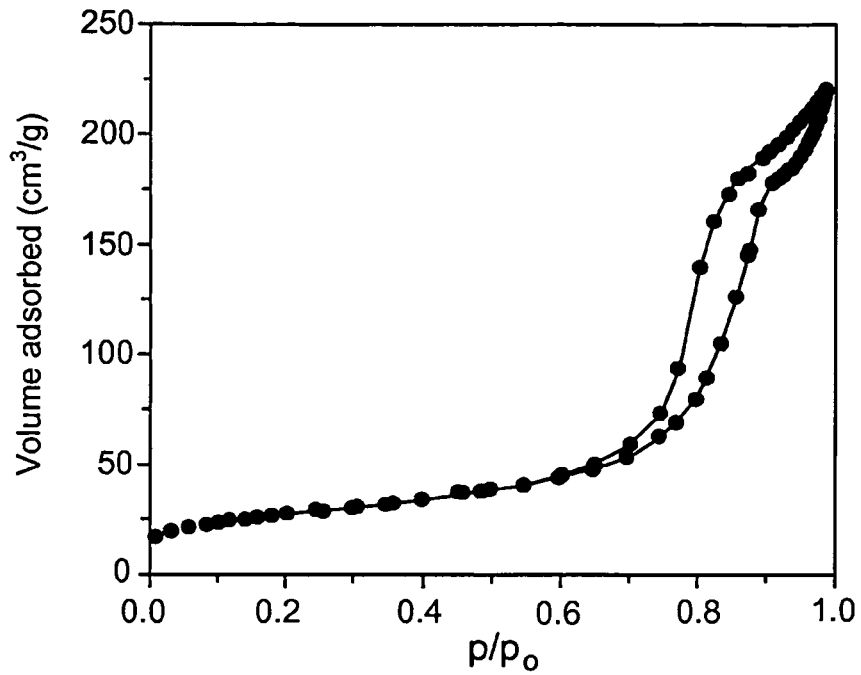
FIGS. 4A and 4B show a nitrogen sorption isotherm and pore size distribution of an example porous $TiO_2$-geopolymer composite material (Example 6).
Figure 4B:
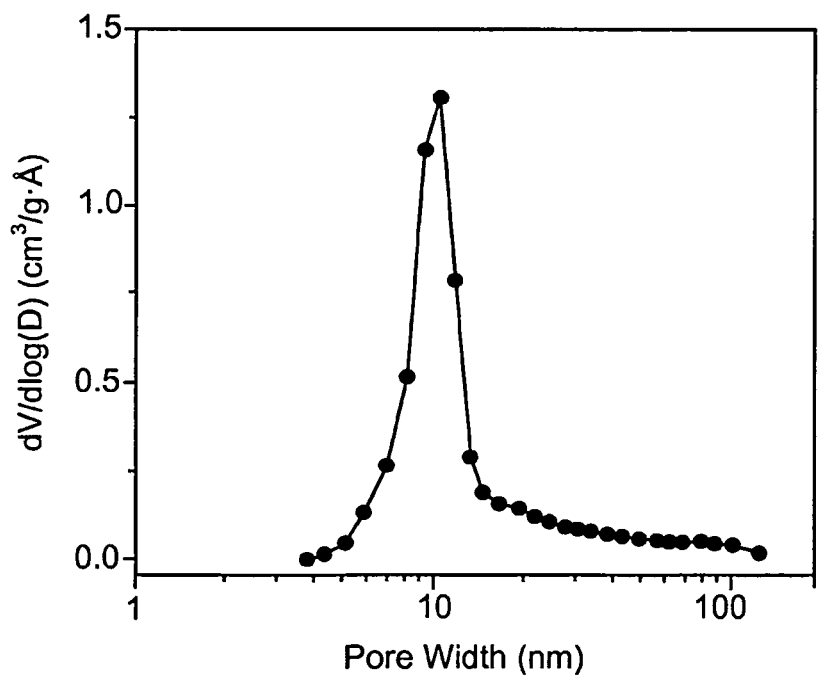

6.1 g of KOH was dissolved in 10 ml of water into which 3.33 g of fumed silica was added subsequently. The solution was then stirred until it became homogeneous by visual observation. In the solution, 6.67 g of metakaolin was added and stirred until the solution became visually homogeneous. The resulting geopolymer resin had a viscosity that much higher than honey. 10 g of anatase $TiO_2$ having a mean particle size of about 32 nm was then added to 10 ml of canola oil and well mixed for about half an hour. The mixture was added into the geopolymer resin and stirred vigorously until the mixture became homogeneous by visual observation. This mixture was then heated in a closed container at 40° C. for 24 hours, which resulted in a hard solid monolith. The monolith was placed in a THF bath for a few days to remove the oil from the monolith. The monolith was then removed from the THF solvent and placed in a lab oven for drying. The product showed a BET surface area of about 98 m²/g, a BJH desorption cumulative pore volume of about 0.34 cm³/g, and a BJH desorption pore width of about 12.8 nm. FIGS. 4A and 4B show a nitrogen sorption isotherm and BJH pore size distribution of the product.

Example 7

6.1 g of KOH was dissolved in 10 ml of water into which 3.33 g of fumed silica was added subsequently. The solution was then stirred until it became visually homogeneous. In the solution, 6.67 g of metakaolin was added and stirred until the solution became homogeneous by visual observation. 10 g of NaA zeolite particles having a mean particle size of about 80 μm was then added to 10 ml of canola oil and well mixed for about half an hour. The mixture was added into the geopolymer resin and stirred vigorously until the mixture became visually homogeneous. This mixture was then heated in a closed container at 40° C. for 24 hours, which resulted in a hard solid monolith. The monolith was placed in a THF bath for a few days to remove the oil from the monolith. The monolith was then removed from the THF solvent and placed in a lab oven to dry. The product showed a BET surface area of about 113 m²/g (mainly from mesopores), a BJH desorption cumulative pore volume of about 0.43 cm³/g and a BJH desorption pore width of about 12.4 nm.

Example 8

6.1 g of KOH was dissolved in 10 ml of water into which 3.33 g of fumed silica was added subsequently. The solution was then stirred until it became homogeneous by visual observation. In the solution, 6.67 g of metakaolin was added and stirred until the solution became visually homogeneous. 6.0 g of powdered yeast granules was then added to 10 ml of canola oil and well mixed for about half an hour. The mixture was added into the geopolymer resin and stirred vigorously until the mixture became homogeneous by visual observation. The mixture was then heated in a closed container at 40° C. for 24 hours, which resulted in a hard solid monolith that was porous. The yeast was burned off by a heat treatment, thereby leaving a calcined porous geopolymer material that has a density lower than the original yeast-geopolymer composite.

Example 9

100 mg of a porous geopolymer prepared from a geopolymer resin as described above and canola oil was soaked in 0.5 mM solution of $HAuCl_4$ and dried for about 6 hours at 110° C. to evaporate any water present. The porous geopolymer was then soaked in excess $NaBH_4$ (0.1 M) solution. The $NaBH_4$ reduced the Au(III) ions inside the porous geopolymer to form gold nanoparticles in the pores.

Example 10

Figure 5A:
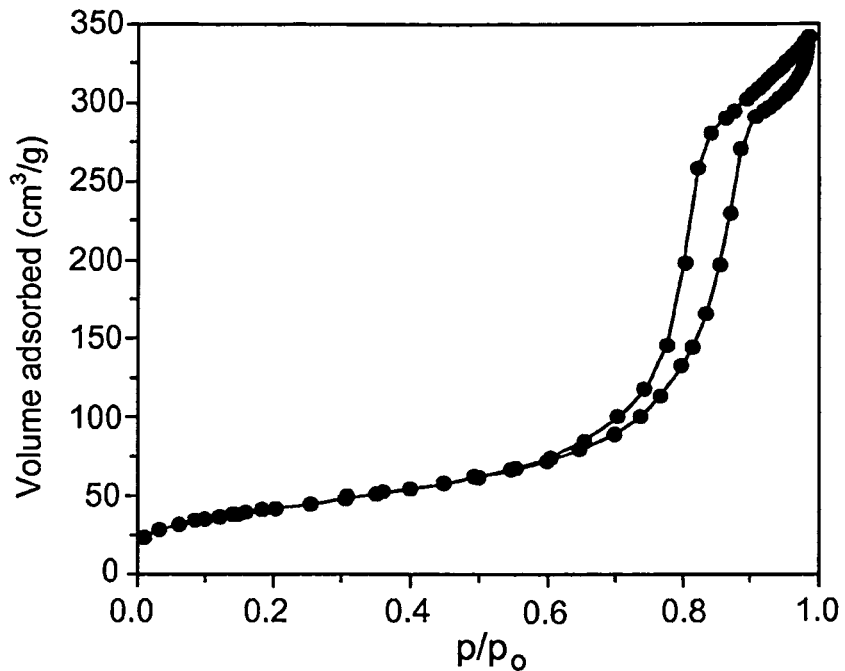
FIGS. 5A and 5B show a nitrogen sorption isotherm and pore size distribution of an example porous geopolymer material (cured in an open container) formed by mixing a geopolymer resin and canola oil (Example 10).
Figure 5B:
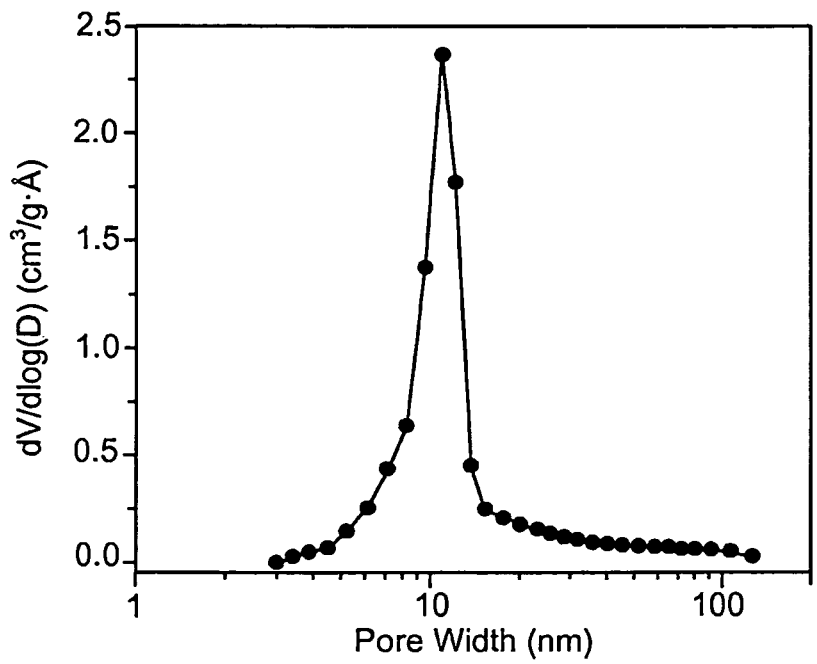
Figure 5C:
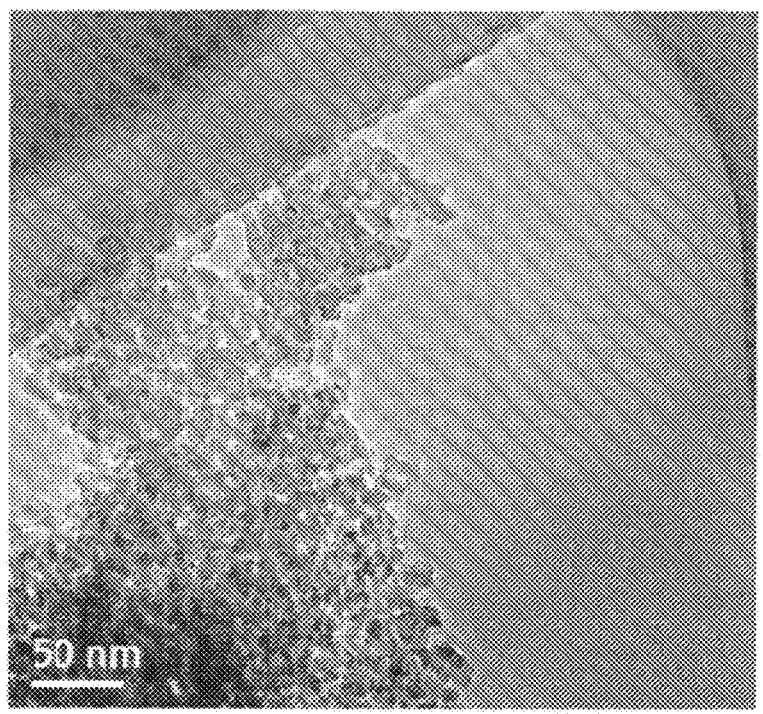
FIGS. 5C and 5D show transmission electron microscope (TEM) and SEM images of the same sample. The sample exhibits a hierarchically porous structure with both mesopores and macropores.
Figure 5D:
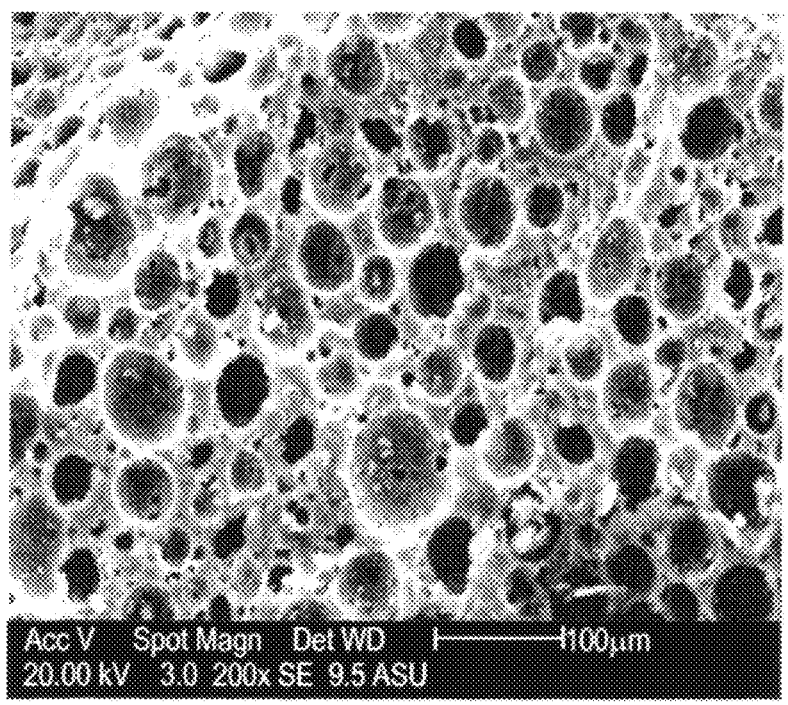

12.2 g of KOH was dissolved in 20 ml of water into which 6.7 g of fumed silica was added subsequently. The solution was then stirred until it became homogeneous by visual observation. In the solution, 12.3 g of metakaolin was added and stirred until the solution became visually homogeneous. 20 ml of canola oil was then added into the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 155 m²/g, a BJH desorption cumulative pore volume of about 0.53 cm³/g and a BJH desorption pore width of 14 nm. FIGS. 5A and 5B show a nitrogen sorption isotherm and BJH pore size distribution of the product. FIGS. 5C and 5D shows TEM and SEM images of the product.

Example 11

Figure 6A:
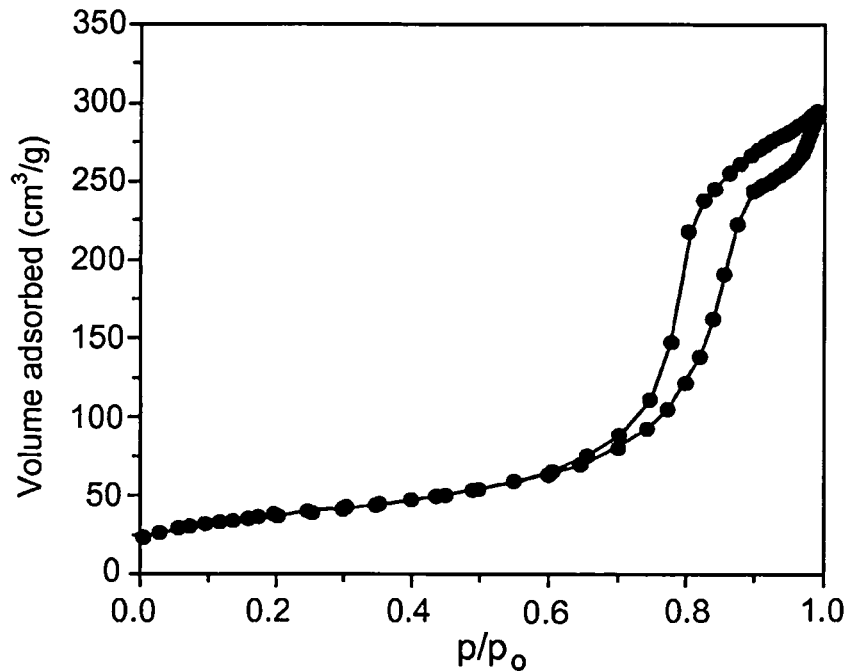
FIGS. 6A and 6B show a nitrogen sorption isotherm and pore size distribution of the porous geopolymer material in Example 10 after heated at 500° C. for 6 hours in air (Example 11).
Figure 6B:
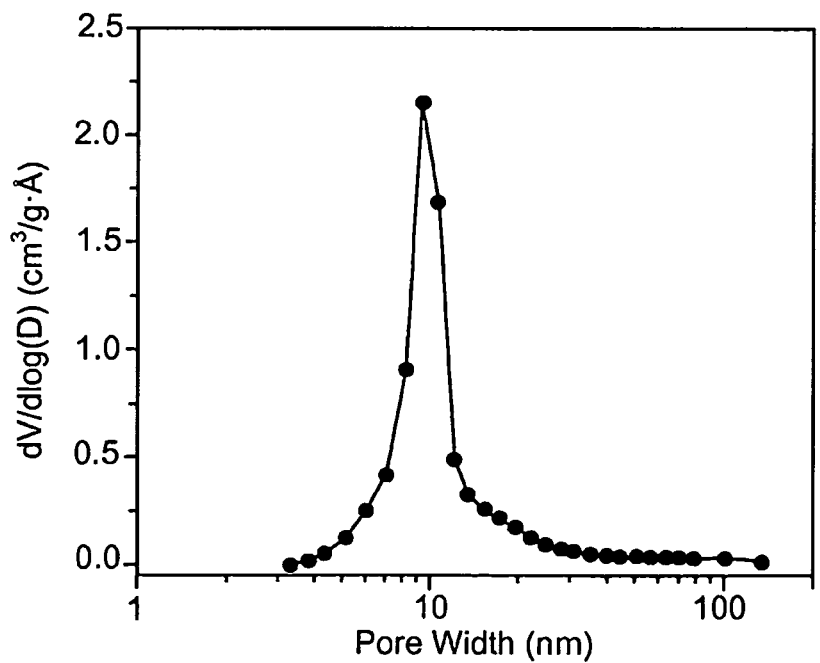

The porous geopolymer in Example 10 was heated at 500° C. for 6 hours in air and the resulting sample after heat treatment exhibited a BET surface area of about 136 m²/g, a BJH desorption cumulative pore volume of about 0.45 cm³/g and a BJH desorption pore width of 13 nm. FIGS. 6A and 6B show a nitrogen sorption isotherm and BJH pore size distribution of the product.

Example 12

12.2 g of KOH was dissolved in 20 ml of water into which 6.7 g of fumed silica was added subsequently. The solution was then stirred until it became homogeneous by visual observation. In the solution, 12.3 g of metakaolin was added and stirred until the solution became visually homogeneous. 20 ml of olive oil was then added into the geopolymer resin and stirred vigorously until the mixture became homogeneous by visual observation. The mixture was heated in a closed container at 40° C. for 24 hours, which resulted in a hard solid monolith. The monolith was immersed in a THF bath to remove the oil from the monolith. The monolith was then removed from the bath and dried in a lab oven at 110° C. The product exhibited a BET surface area of about 60 m²/g, a BJH desorption cumulative pore volume of about 0.23 cm³/g, and a BJH desorption pore width of about 11 nm.

Example 13

Figure 7A:
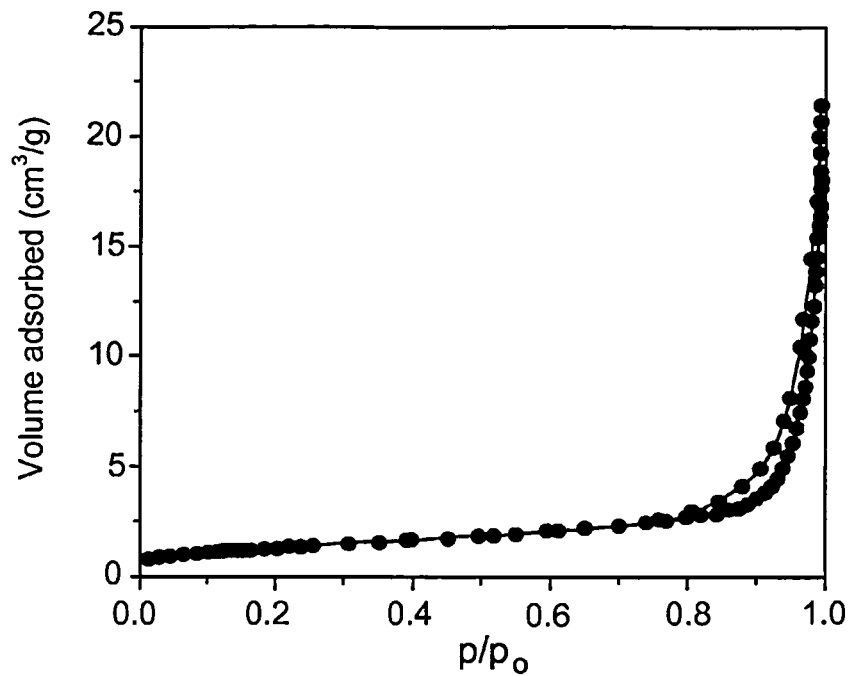
FIGS. 7A and 7B show a nitrogen sorption isotherm and pore size distribution of an example porous geopolymer material (cured in an open container) formed by mixing a geopolymer resin and mineral oil (Example 13).
Figure 7B:
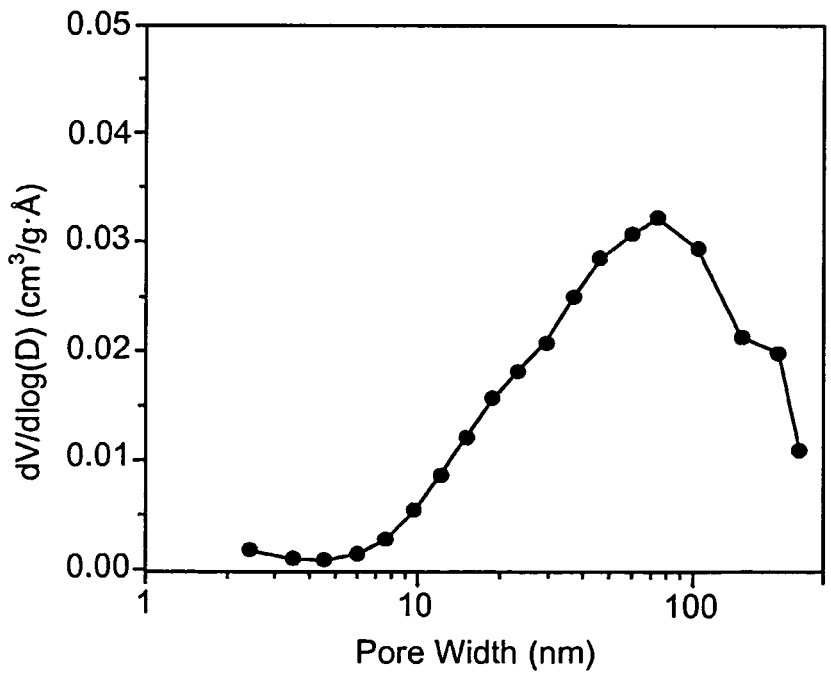
Figure 7C:
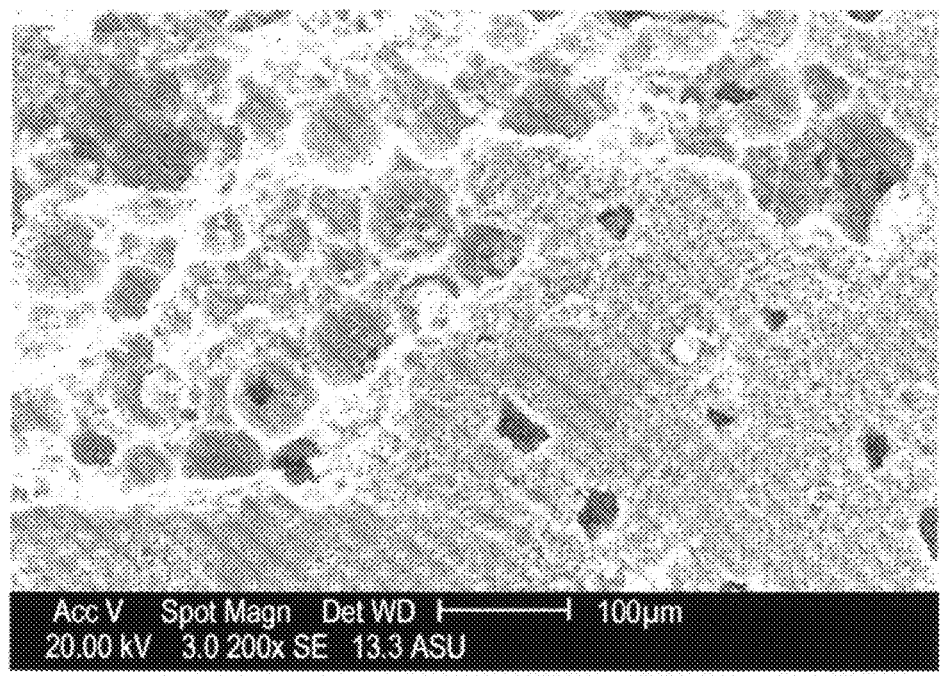
FIGS. 7C and 7D shows SEM images of the sample.
Figure 7D:
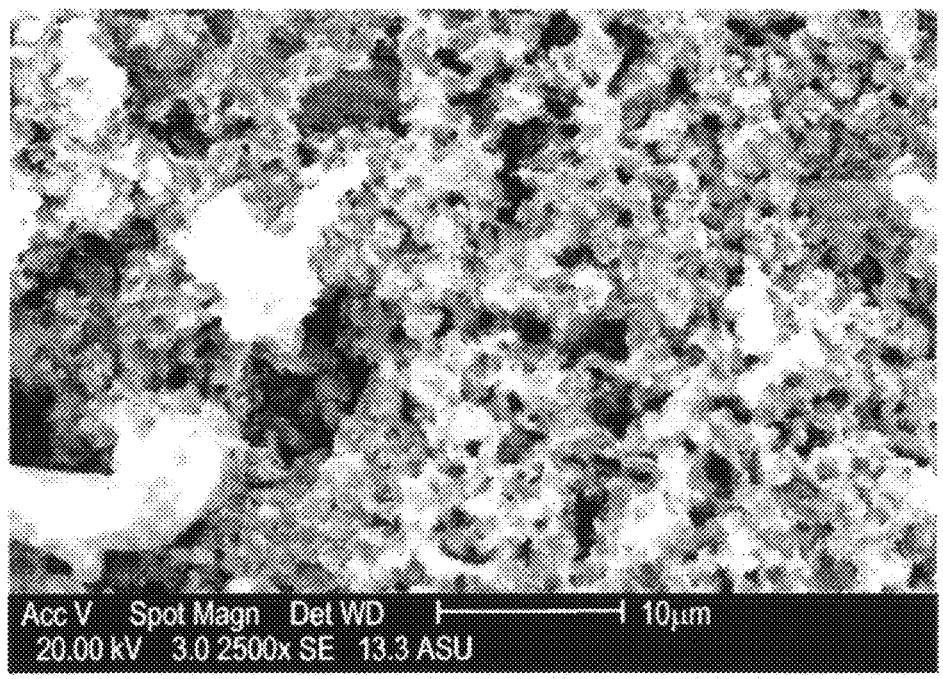

12.2 g of KOH was dissolved in 20 ml of water into which 6.7 g of fumed silica was added subsequently. The solution was then stirred until it became homogeneous by visual observation. In the solution, 12.3 g of metakaolin was added and stirred until the solution became visually homogeneous. 20 ml of mineral oil was then added into the geopolymer resin and stirred vigorously until the mixture became homogeneous by visual observation. The mixture was heated in a closed container at 40° C. for 24 hours, which resulted in a hard solid monolith. The monolith was immersed in a hexane bath to remove the oil from the monolith. The monolith was then removed from the bath and dried in a lab oven at 110° C. FIGS. 7A and 7B show a nitrogen sorption isotherm and BJH pore size distribution of the product. The product exhibited a BET surface area of about 19 m²/g, a BJH desorption cumulative pore volume of about 0.08 cm³/g, and a BJH desorption pore width of about 13 nm. However, the product exhibits macropores as shown in the SEM images of the product (FIGS. 7C and 7D).

Example 14

Figure 8A:
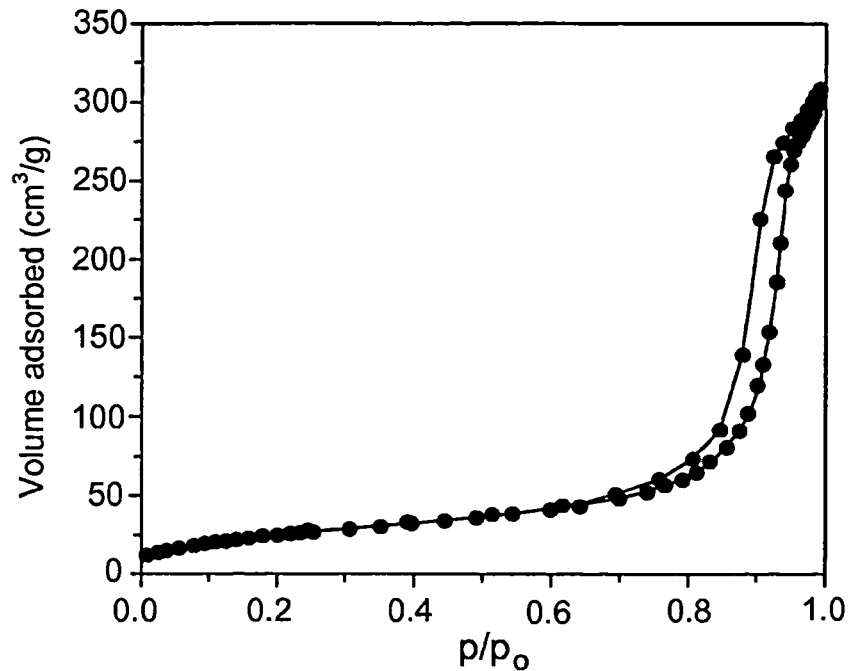
FIGS. 8A and 8B show a nitrogen sorption isotherm and pore size distribution of an example porous geopolymer material formed by mixing a geopolymer resin and biodiesel (Example 14).
Figure 8B:
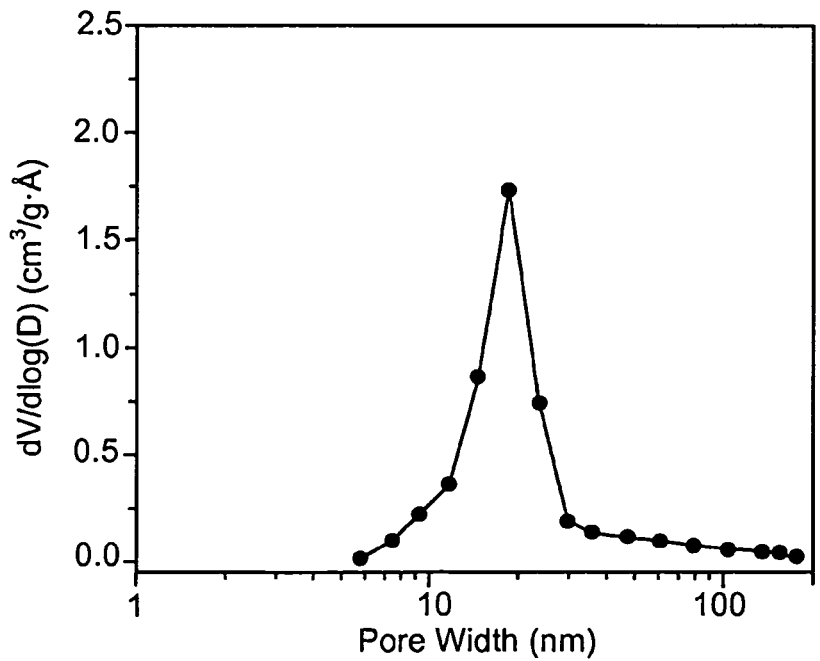

12.2 g of KOH was dissolved in 20 ml of water into which 6.7 g of fumed silica was added subsequently. The solution was then stirred until it became homogeneous by visual observation. In the solution, 12.3 g of metakaolin was added and stirred until the solution became visually homogeneous. 20 ml of biodiesel was then added into the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 93 m²/g, a BJH desorption cumulative pore volume of about 0.47 cm³/g, and a BJH desorption pore width of 20 nm. FIGS. 8A and 8B show a nitrogen sorption isotherm and BJH pore size distribution of the product.

Example 15

Figure 9A:
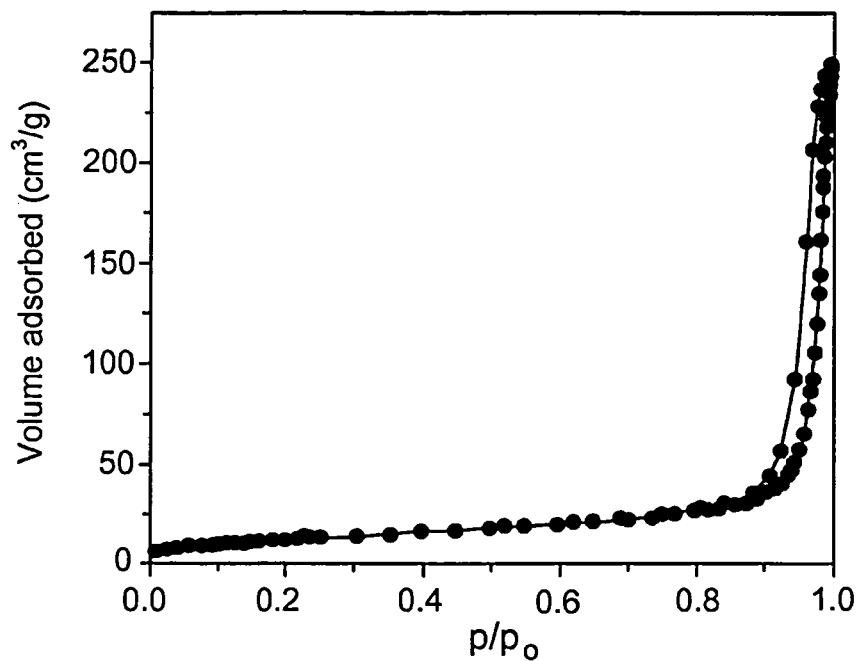
FIGS. 9A and 9B show a nitrogen sorption isotherm and pore size distribution of an example porous geopolymer material formed by mixing a geopolymer resin and lard (Example 15).
Figure 9B:
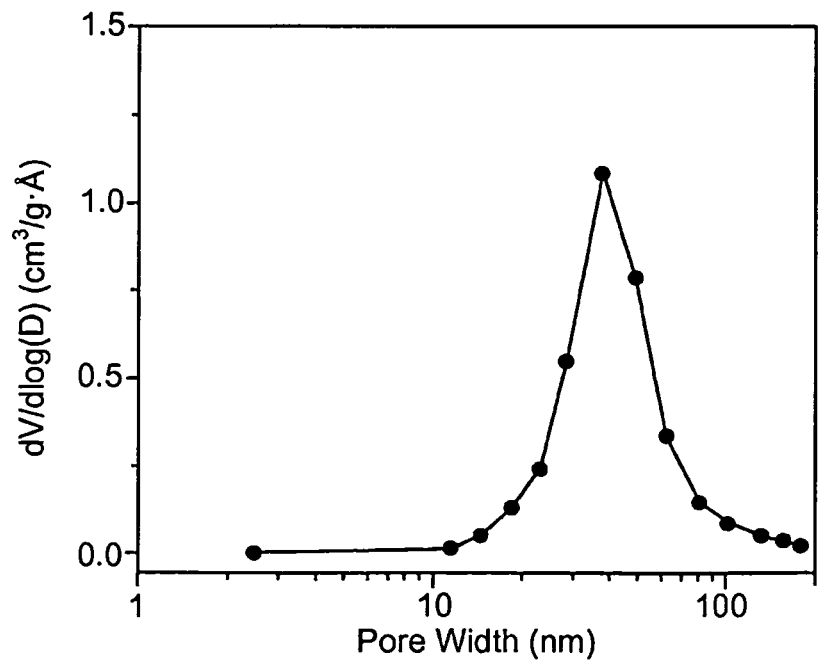

12.2 g of KOH was dissolved in 20 ml of water into which 6.7 g of fumed silica was added subsequently. The solution was then stirred until it became homogeneous by visual observation. In the solution, 12.3 g of metakaolin was added and stirred until the solution became visually homogeneous. 4 g of lard dissolved in 8 ml of mineral oil was then added into the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using hexane as the solvent to remove the mineral oil and n-butanol as the solvent to remove the lard from the monolith. The monolith was then dried in a lab oven at 120° C. The product showed a BET surface area of about 44 m²/g, a BJH desorption cumulative pore volume of about 0.37 cm³/g, and a BJH desorption pore width of 34 nm. FIGS. 9A and 9B show a nitrogen sorption isotherm and BJH pore size distribution of the product.

Example 16

Figure 10A:
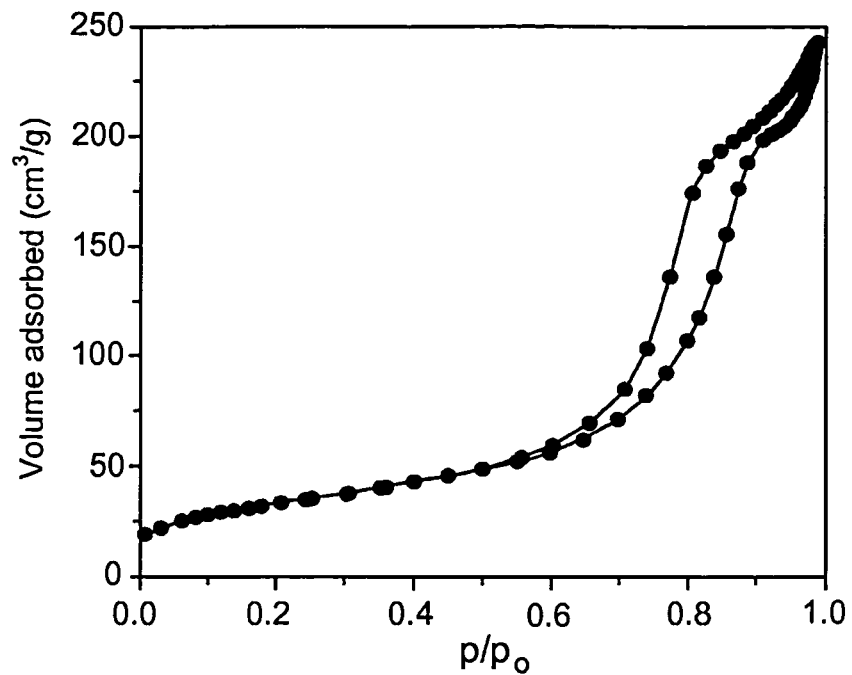
FIGS. 10A and 10B show a nitrogen sorption isotherm and pore size distribution of an example porous geopolymer material formed by mixing a geopolymer resin and waste vegetable oil (Example 16).
Figure 10B:
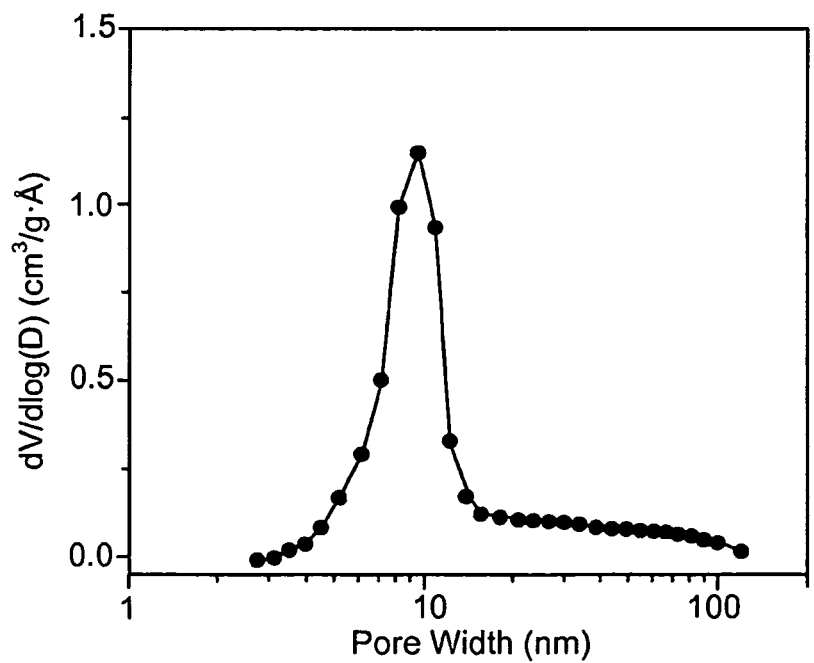

12.2 g of KOH was dissolved in 20 ml of water into which 6.7 g of fumed silica was added subsequently. The solution was then stirred until it became homogeneous by visual observation. In the solution, 12.3 g of metakaolin was added and stirred until the solution became visually homogeneous. 20 ml of waste vegetable oil was then added into the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product exhibited a BET surface area of about 122 m²/g, a BJH desorption cumulative pore volume of about 0.37 cm³/g, and a BJH desorption pore width of 12 nm. FIGS. 10A and 10B show a nitrogen sorption isotherm and BJH pore size distribution of the product.

Example 17

Figure 11A:
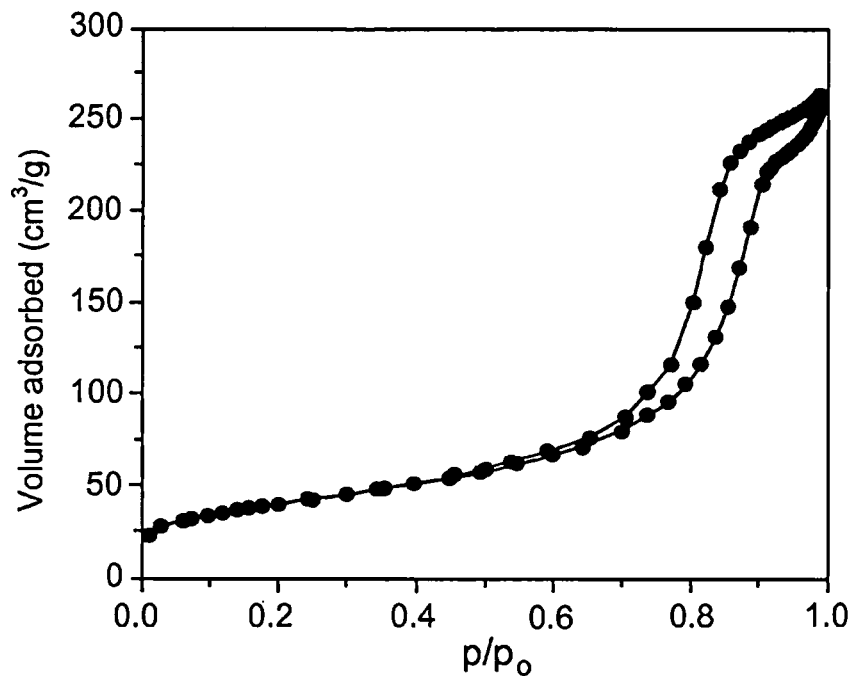
FIGS. 11A and 11B show a nitrogen sorption isotherm and pore size distribution of an example porous geopolymer-iron (oxy)hydroxide composite material.
Figure 11B:
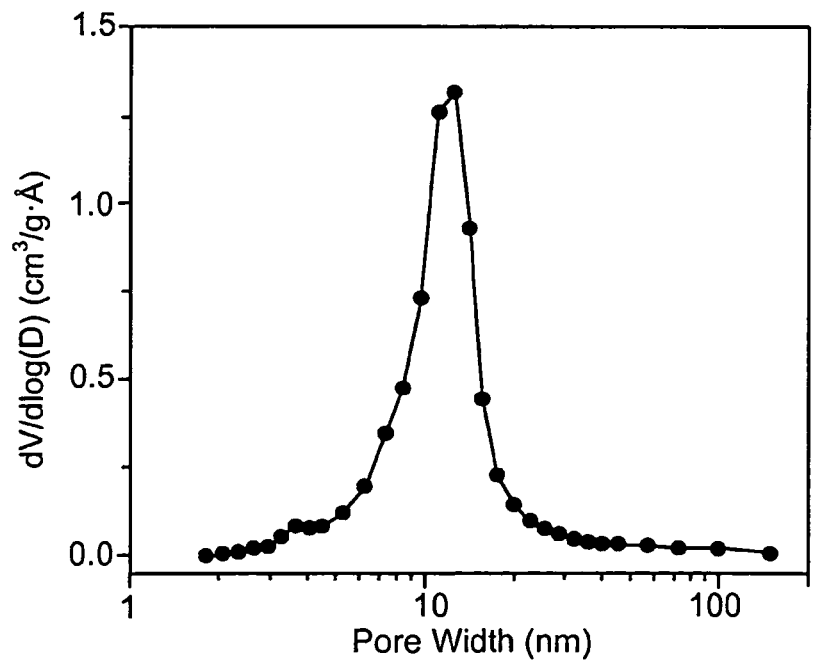
Figure 11C:
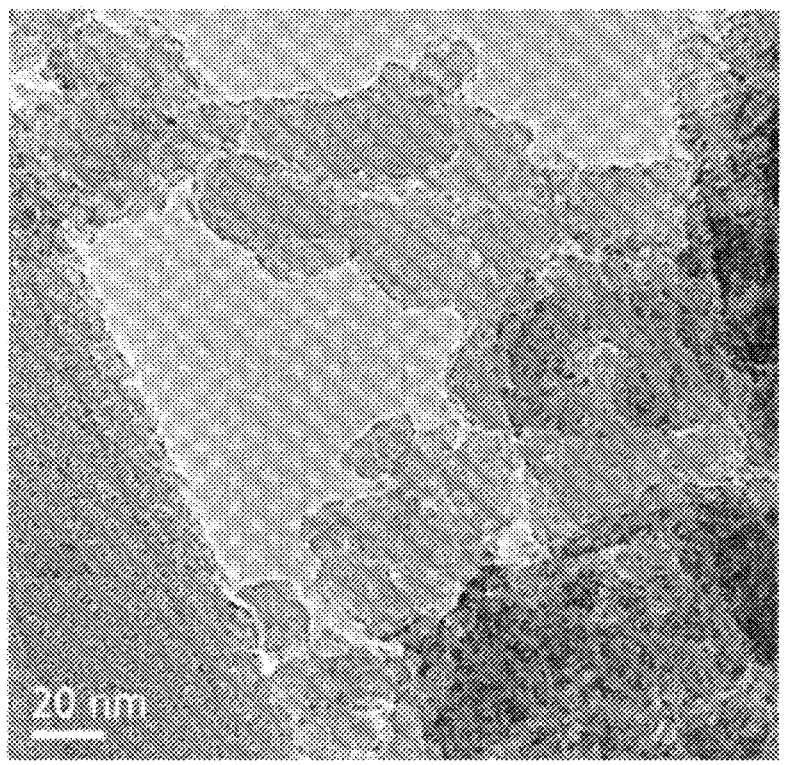
FIG. 11C shows a TEM image of the material (Example 17).

4 g of porous geopolymer particles of size between 0.25 mm to 1.68 mm (prepared by following the procedure in Example 10) was soaked in 1M $FeCl_3 \cdot 6H_2O$ in methanol for 24 hours. The resulting porous geopolymer particles were filtered and dried at 100° C. for 6 hours to give porous geopolymer-iron (oxy)hydroxide composite material. This composite material exhibited KCl within the pores as byproduct. This KCl by-product was removed from the pores of the composite material by repeated washing with deionized water. This composite material exhibited a BET surface area of about 150 m²/g, a BJH desorption cumulative pore volume of about 0.40 cm³/g, and a BJH desorption pore width of 11 nm. FIGS. 11A and 11B show a nitrogen sorption isotherm and BJH pore size distribution and FIG. 11C shows the TEM image of the product.

Example 18

Figure 12A:
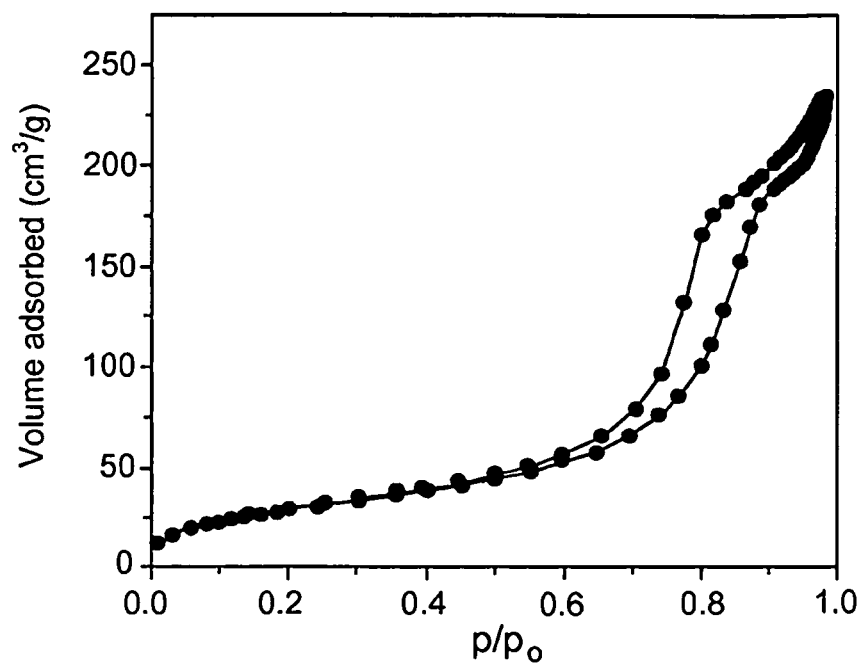
FIGS. 12A and 12B show a nitrogen sorption isotherm and pore size distribution of an example porous geopolymer-ferrofluid composite material (Example 18).
Figure 12B:
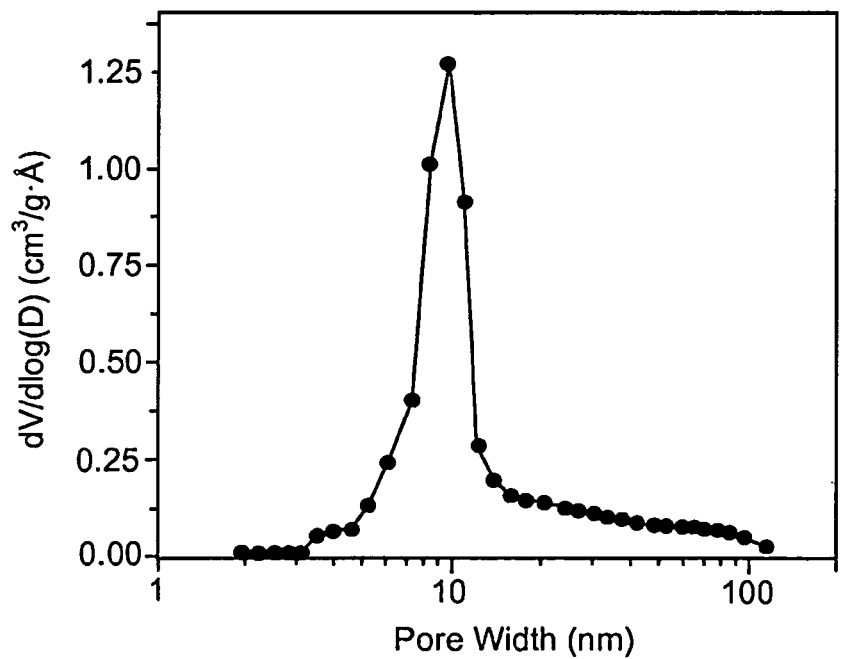

6.1 g of KOH was dissolved in 10 ml of water into which 3.33 g of fumed silica was added subsequently. The solution was then stirred until it became homogeneous by visual observation. In the solution, 6.17 g of metakaolin was added and stirred until the solution became visually homogeneous. 5 ml of a ferrofluid was added to 5 ml of canola oil and well mixed for about half an hour. The mixture was added to the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 110 m²/g, a BJH desorption cumulative pore volume of about 0.36 cm³/g, and a BJH desorption pore width of 13 nm. FIGS. 12A and 12B show a nitrogen sorption isotherm and BJH pore size distribution of the product.

Example 19

Figure 13A:
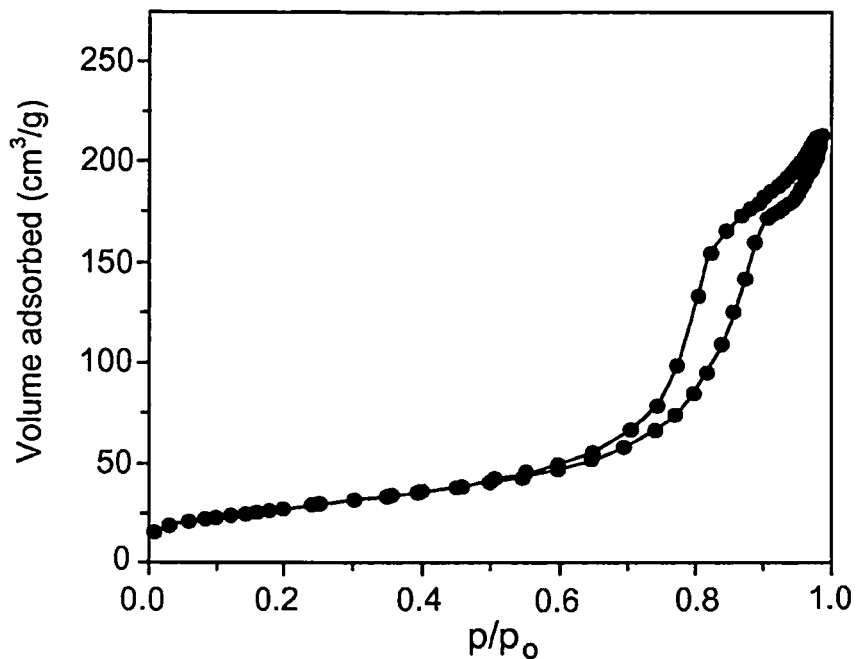
FIGS. 13A and 13B show a nitrogen sorption isotherm and pore size distribution of an example porous geopolymer-halloysite nanoclay composite material (Example 19).
Figure 13B:
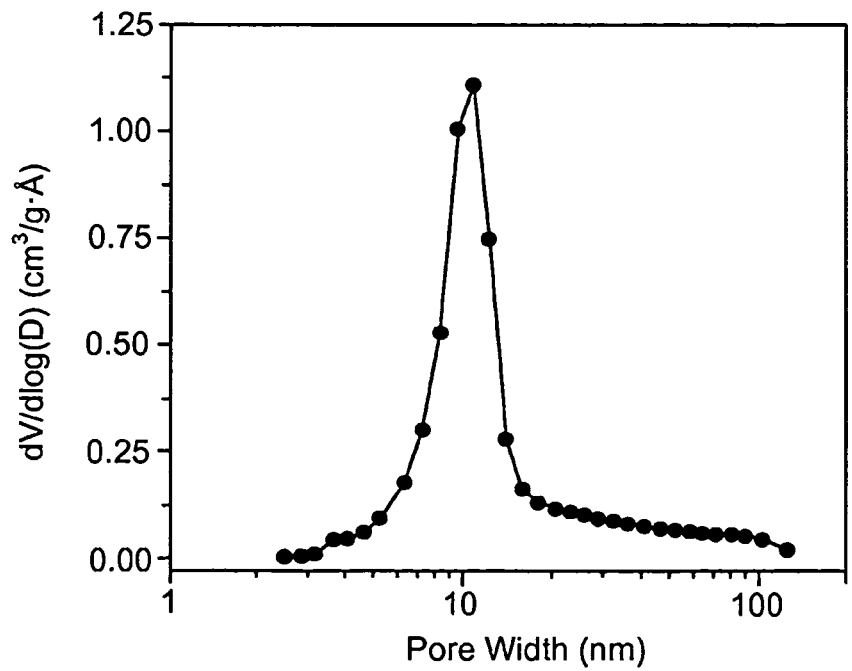

6.1 g of KOH was dissolved in 10 ml of water into which 3.33 g of fumed silica was added subsequently. The solution was then stirred until it became homogeneous by visual observation. 6.17 g of metakaolin was added and stirred until the solution became visually homogeneous. 5 g of halloysite nanoclay was then added to 10 ml of canola oil and well mixed for about half an hour. The mixture was added to the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 99 m²/g, a BJH desorption cumulative pore volume of about 0.33 cm³/g, and a BJH desorption pore width of 13 nm. FIGS. 13A and 13B show a nitrogen sorption isotherm and BJH pore size distribution of the product.

Example 20

Figure 14A:
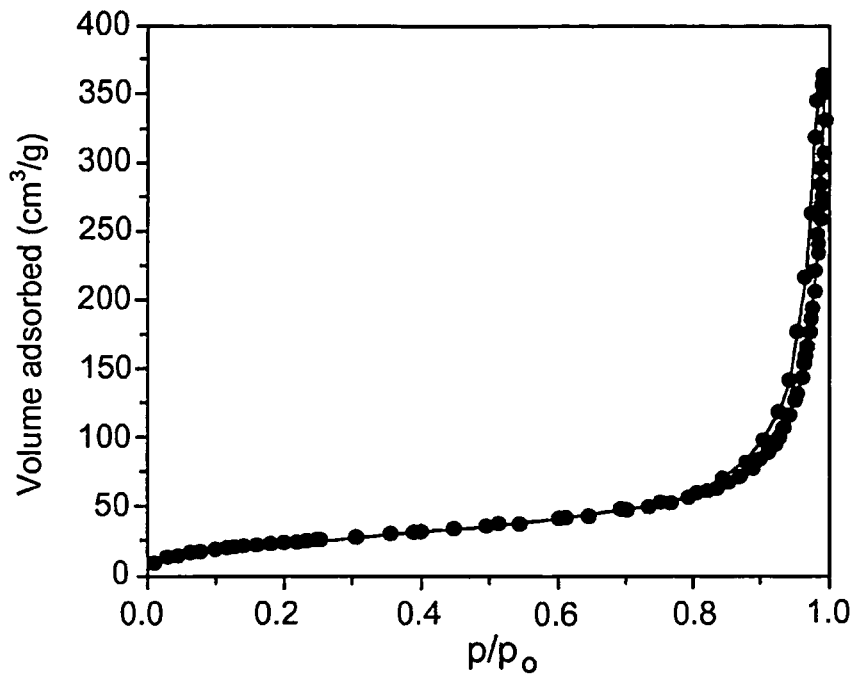
FIGS. 14A and 14B show a nitrogen sorption isotherm and pore size distribution of an example porous geopolymer prepared by using functionalized silicon as the precursor. The mole ratio between functionalized silicon and the other silicon atoms is 1:5 (Example 20).
Figure 14B:
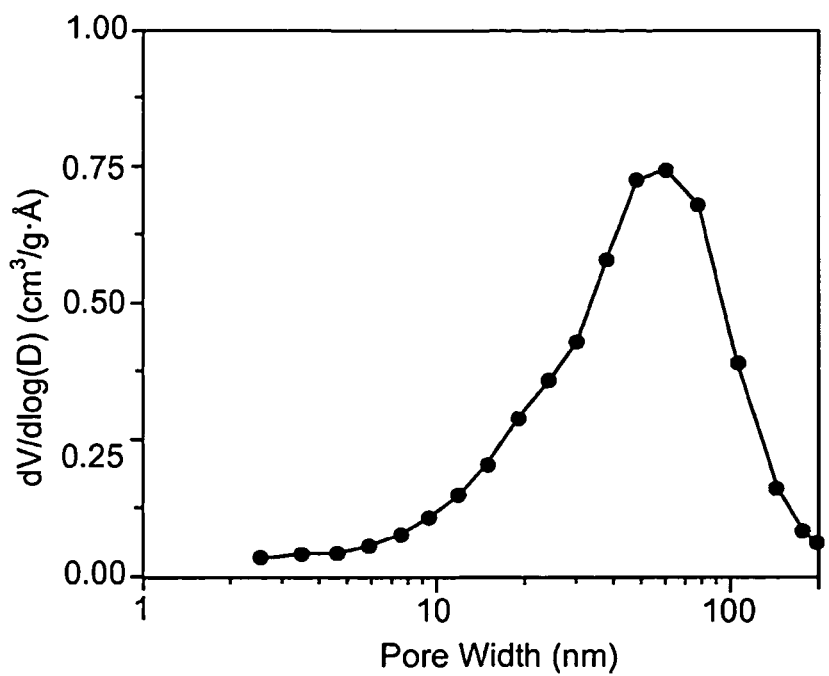

6.1 g of KOH was dissolved in 10 ml of water into which 3.32 g of (3-aminopropyl)trimethoxysilane was added and was stirred for 24 hours. To the resulting solution, 2.22 g of fumed silica was added subsequently. The solution was then stirred until it became homogeneous by visual observation. In the solution, 6.17 g of metakaolin was added and stirred until the solution became visually homogeneous. The resulting geopolymer resin exhibited a viscosity similar to honey. 10 ml of canola oil was then added into the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 88 m²/g, a BJH desorption cumulative pore volume of about 0.51 cm³/g, and a BJH desorption pore width of 23 nm. FIGS. 14A and 14B show a nitrogen sorption isotherm and BJH pore size distribution of the product.

Example 21

Figure 15A:
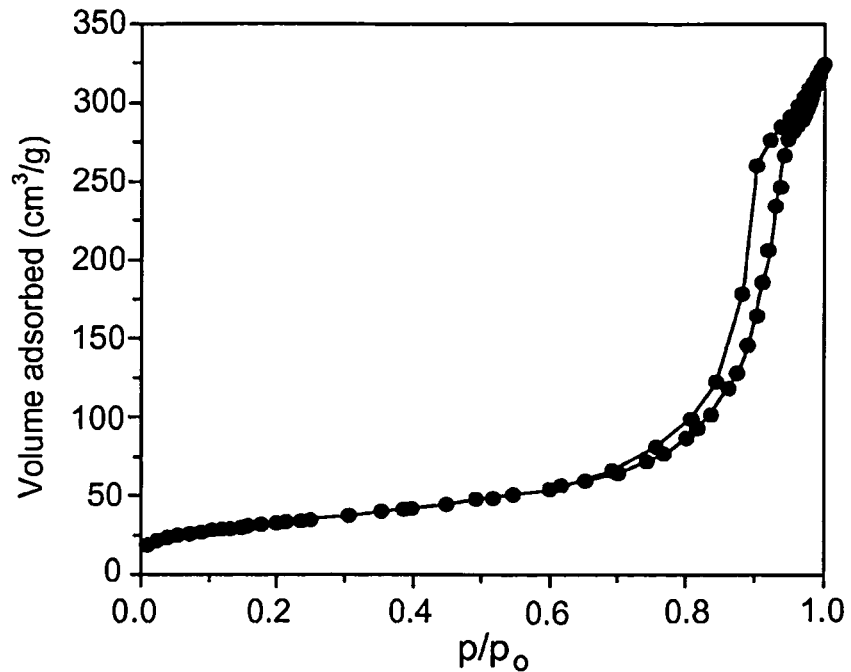
FIGS. 15A and 15B show a nitrogen sorption isotherm and pore size distribution of an example porous geopolymer prepared by using functionalized silicon as the precursor. The mole ratio between functionalized silicon and the other silicon atoms is 1:20 (Example 21).
Figure 15B:
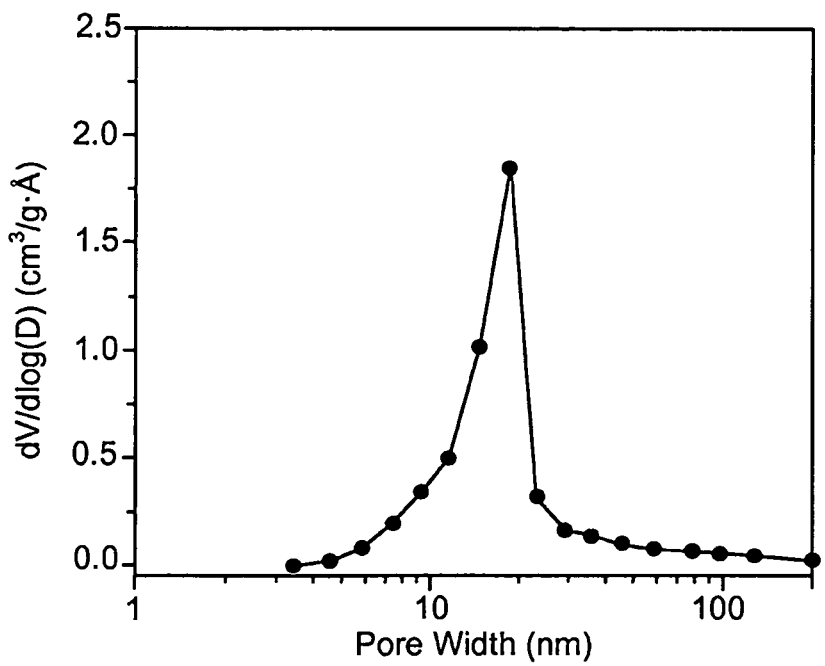

6.1 g of KOH was dissolved in 10 ml of water into which 0.95 g of (3-aminopropyl)trimethoxysilane was added and was stirred for 24 hours. To the resulting solution, 3.02 g of fumed silica was added subsequently. The solution was then stirred until it became homogeneous by visual observation. In the solution, 6.17 g of metakaolin was added and stirred until the solution became visually homogeneous. 10 ml of canola oil was then added into the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 118 m²/g, a BJH desorption cumulative pore volume of about 0.49 cm³/g and a BJH desorption pore width of 17 nm. FIGS. 15A and 15B show a nitrogen sorption isotherm and BJH pore size distribution of the product.

Example 22

Figure 16A:
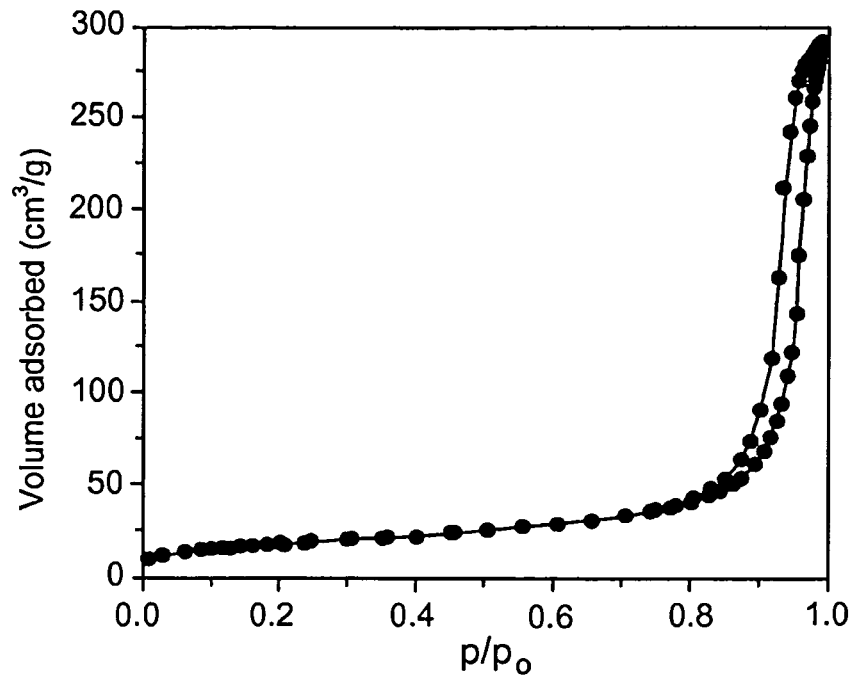
FIGS. 16A and 16B show a nitrogen sorption isotherm and pore size distribution of an example porous geopolymer prepared by employing water glass as the precursor (Example 23).
Figure 16B:
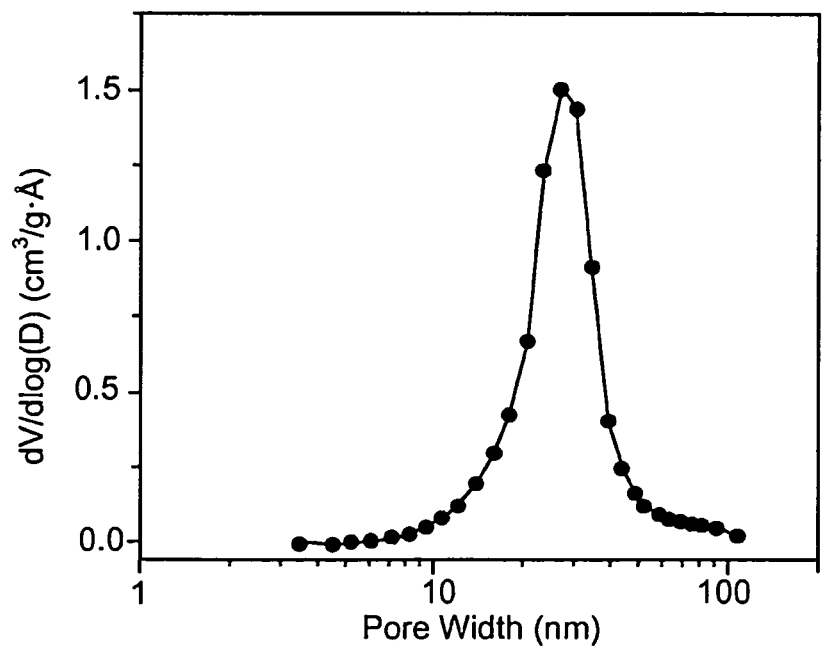

11.46 g of water glass was added to 2.0 ml of water. The solution was then stirred until it became homogeneous by visual observation. In the solution, 5.72 g of metakaolin was added and stirred until the solution became visually homogeneous. 10 ml of canola oil was then added into the geopolymer resin and stirred vigorously until the mixture became homogeneous by visual observation. The mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 66 m²/g, a BJH desorption cumulative pore volume of about 0.45 cm³/g and a BJH desorption pore width of 28 nm. FIGS. 16A and 16B show a nitrogen sorption isotherm and BJH pore size distribution of the product.

Example 23

Figure 17A:
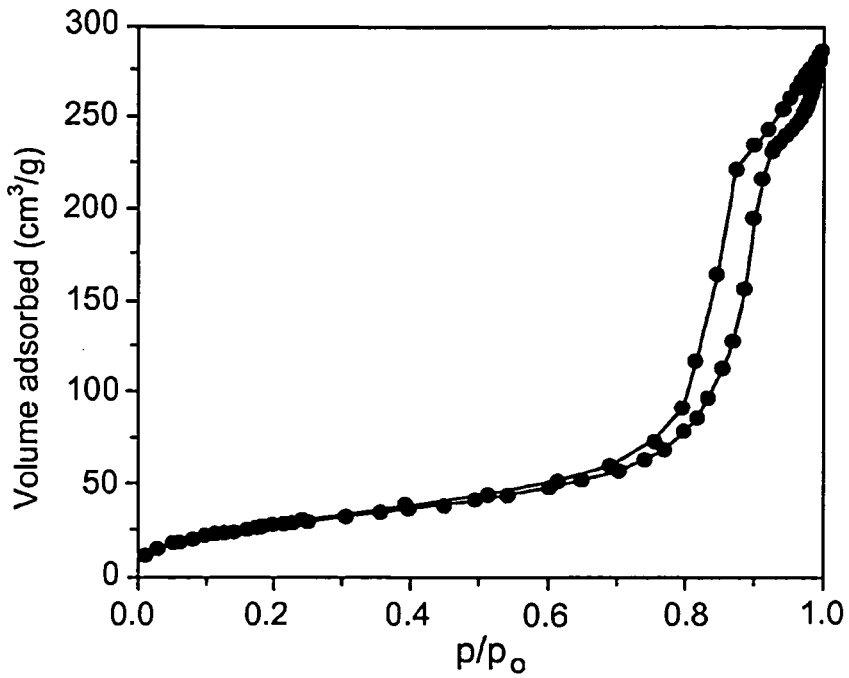
FIGS. 17A and 17B show a nitrogen sorption isotherm and pore size distribution of an example porous geopolymer-polypropylene fiber composite material (Example 24).
Figure 17B:
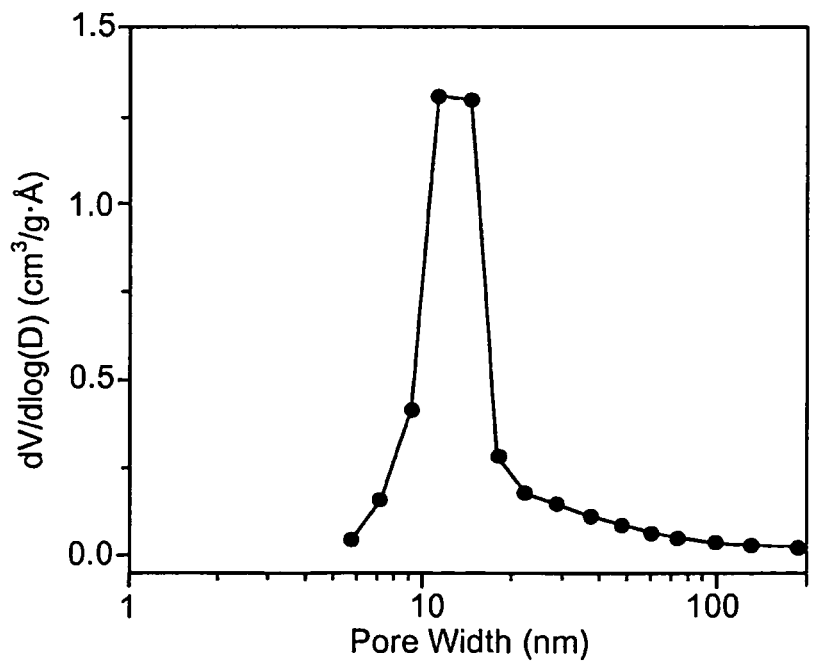

6.1 g of KOH was dissolved in 10 ml of water into which 3.33 g of fumed silica was added subsequently. The solution was then stirred until it became homogeneous by visual observation. In the solution, 6.17 g of metakaolin was added and stirred until the solution became visually homogeneous. 10 ml of canola oil was then added into the geopolymer resin and stirred vigorously until the mixture became homogeneous by visual observation. Polypropylene fiber was added into this homogeneous solution and the mixture was heated in an open container at 50° C. for 24 hours, which resulted in a hard solid monolith. The monolith was subjected to Soxhlet extraction using n-butanol as the solvent to remove the oil from the monolith. The monolith was then dried in a lab oven at 120° C. The product showed a BET surface area of about 128 m²/g, a BJH desorption cumulative pore volume of about 0.44 cm³/g, and a BJH desorption pore width of 17 nm. FIGS. 17A and 17B show a nitrogen sorption isotherm and BJH pore size distribution of the product.

Example 24

Figure 18A:
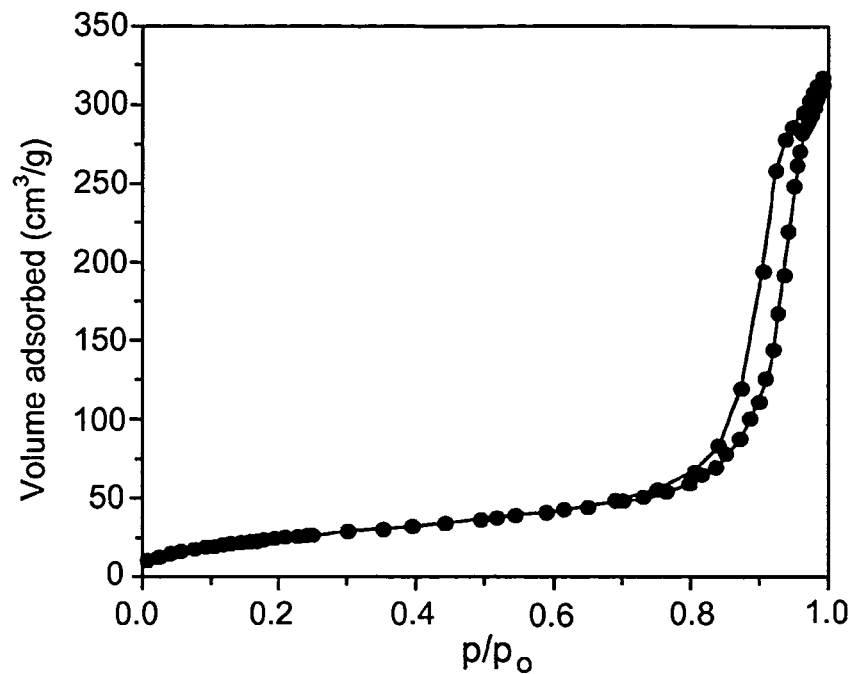
FIGS. 18A and 18B show a nitrogen sorption isotherm and pore size distribution of an example porous geopolymer prepared by sequentially adding canola oil and hexane (Example 24).
Figure 18B:
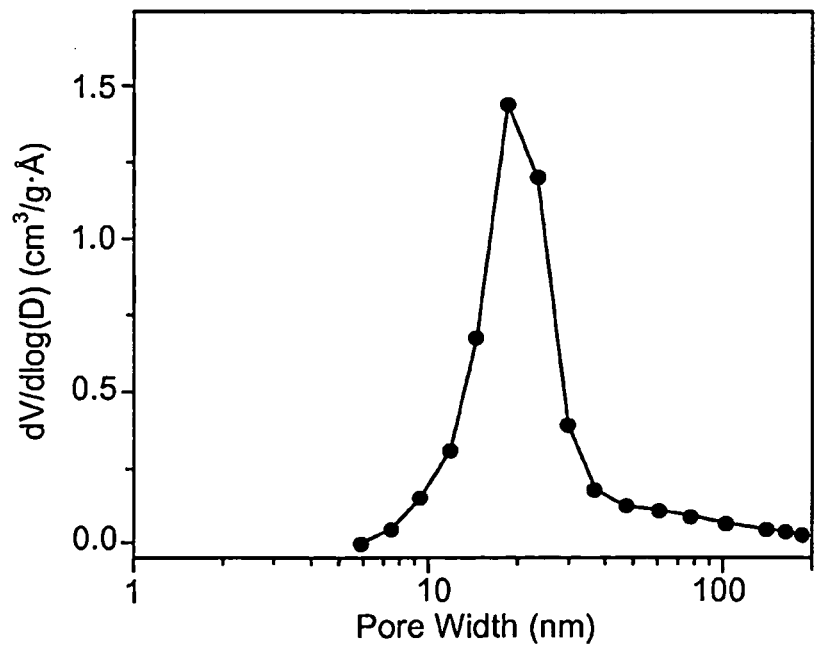

6.1 g of KOH was dissolved in 10 ml of water into which 3.33 g of fumed silica was added subsequently. The solution was then stirred until it became homogeneous by visual observation. In the solution, 6.17 g of metakaolin was added and stirred until the solution became visually homogeneous. 10 ml of canola oil was then added into the geopolymer resin and stirred vigorously until the mixture became homogeneous by visual observation. 40 ml of hexane was added to the above mixture and stirred vigorously for about 20 minutes to obtain a homogeneous mixture. The mixture was poured into a container and closed tightly before letting it to stand for 2 days at room temperature, which resulted in a hard solid monolith. The monolith was subjected to Soxhlet extraction using n-butanol as the solvent to remove the oil from the monolith. The monolith was then dried in a lab oven at 120° C. The product showed a BET surface area of about 92 $m^2/g$, a BJH desorption cumulative pore volume of about 0.48 $cm^3/g$, and a BJH desorption pore width of 21 nm. FIGS. 18A and 18B show a nitrogen sorption isotherm and BJH pore size distribution of the product.

Example 25

1.0 g of porous geopolymer particles of size between 0.25 mm to 1.68 mm (prepared by following the procedure in Example 10) was heated along with 1.80 ml of water in an autoclave for 48 hours at 75° C. The powder X-ray diffraction pattern of this resulting material exhibited well-shaped Bragg reflection peaks, which indicated a crystallinity of the product.

Example 26

3.05 g of KOH was dissolved in 10 ml of water into which 3.33 g of fumed silica was added subsequently. The solution was then stirred until it became homogeneous by visual observation. In the solution, 6.17 g of metakaolin was added and stirred until the solution became visually homogeneous. 3.53 g of resorcinol was dissolved in 5 ml of 37% formaldehyde solution. This solution was added to the geopolymer resin kept in an ice bath and stirred vigorously until the mixture became homogeneous by visual observation. The mixture was heated in an open container at 50° C. for 24 hours, which resulted in a hard solid monolith. The product was red in color, which indicated polymerization of resorcinol and formaldehyde. The material was dried and calcined. The calcined product showed a macroporosity.

Example 27

Figure 19A:
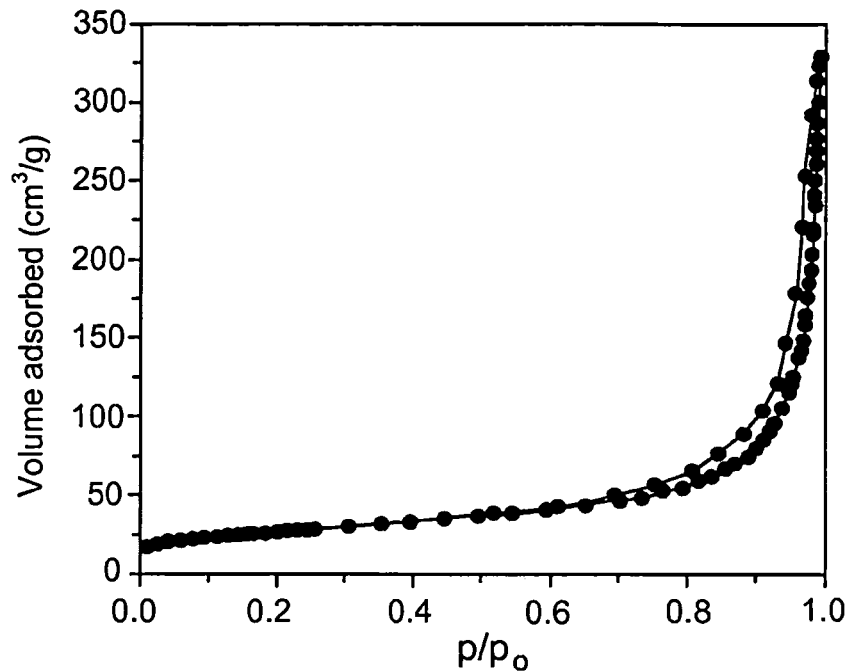
FIGS. 19A and 19B show a nitrogen sorption isotherm and pore size distribution of an example porous geopolymer material formed by mixing a geopolymer resin and glycerin (Example 27).
Figure 19B:
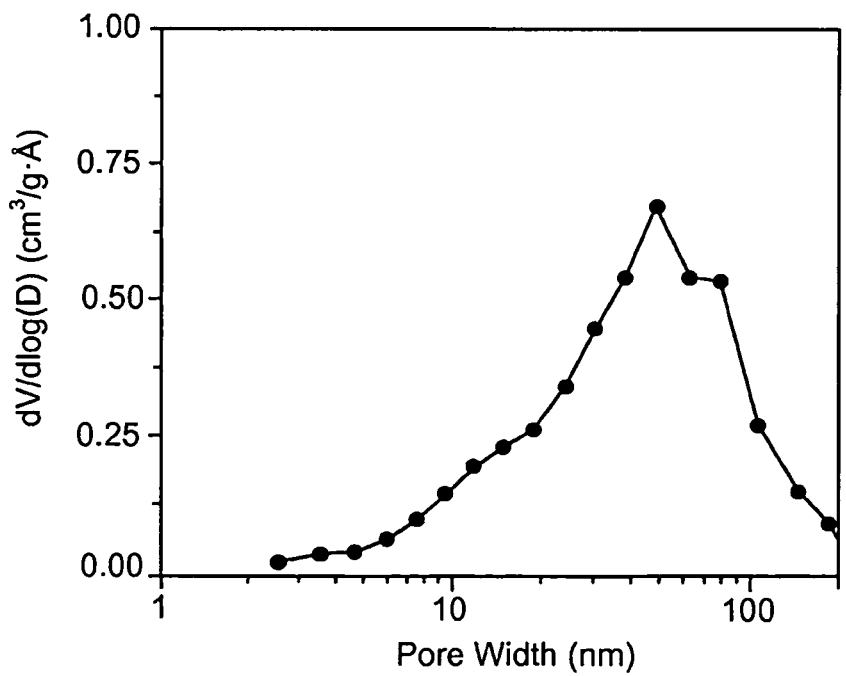

6.1 g of KOH was dissolved in 10 ml of water into which 3.33 g of fumed silica was added subsequently. The solution was then stirred until it became homogeneous by visual observation. In the solution, 6.17 g of metakaolin was added and stirred until the solution became visually homogeneous. 10 ml of glycerin was then added into the geopolymer resin and stirred vigorously until the mixture became homogeneous by visual observation. The mixture was heated in an open container at 50° C. for 24 hours, which resulted in a solid monolith. The monolith was subjected to Soxhlet extraction using water as the solvent to remove the oil from the monolith. The monolith was then dried in a lab oven at 120° C. The product showed a BET surface area of about 97 $m^2/g$, a BJH desorption cumulative pore volume of about 0.50 $cm^3/g$, and a BJH desorption pore width of 26 nm. FIGS. 19A and 19B show a nitrogen sorption isotherm and BJH pore size distribution of the product.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations, modifications and enhancements of the disclosed implementations and other implementations can be made based on what is described and illustrated in this document.

What is claimed is:

1. A method of fabricating a porous material, the method comprising:
   combining a geopolymer resin and a liquid to form a mixture;
   stirring, shaking, shearing, agitating, sonicating, or vibrating the mixture at a pressure lower than atmospheric pressure;
   solidifying the mixture to form a solid embedded with the liquid; and
   removing at least a portion of the liquid from the solid to yield the porous material.

2. The method of claim 1, wherein the liquid comprises a water-immiscible liquid.

3. The method of claim 1, further comprising combining the geopolymer resin and the liquid with one or more additional components to form the mixture.

4. The method of claim 1, further comprising forming the geopolymer resin by combining one or more inorganic materials selected from the group consisting of fumed silica, rice husk ash, silica fume, silicates, aluminates, aluminosilicates, organosilanes, clays, minerals, metakaolin, calcined clays, fly ash, slag, pozzolan, incinerated utility waste, glass powder, and red mud with an alkaline or basic solution.

5. The method of claim 1, further comprising stirring, shaking, shearing, agitating, sonicating, or vibrating the mixture.

6. The method of claim 1, wherein solidifying the mixture comprises curing the mixture at ambient temperature.

7. The method of claim 1, wherein solidifying the mixture comprises heating the mixture under a controlled humidity or at a temperature below the boiling point of the liquid.

8. The method of claim 1, wherein solidifying the mixture comprises stirring, shaking, shearing, agitating, sonicating, vibrating, spinning, spreading, screeding, spraying, dispensing, injecting, foaming, shaping, molding, ribboning, extruding, or pultruding the mixture.

9. The method of claim 1, wherein solidifying the mixture comprises spinning, spreading, screeding, spraying, dispensing, injecting, foaming, shaping, molding, ribboning, extruding, or pultruding the mixture and heating the mixture during at least part of the time during spinning, spreading, screeding, spraying, dispensing, injecting, foaming, shaping, molding, ribboning, extruding, or pultruding.

10. The method of claim 1, wherein removing at least the portion of the liquid comprises extracting the liquid.

11. The method of claim 10, wherein removing at least the portion of the liquid comprises soaking the solid in one or more solvents selected from the group consisting of water, tetrahydrofuran, hexane, acetonitrile, dimethyl sulfoxide, a hydrocarbon, a halogenated hydrocarbon, a ketone, an aldehyde, an amine, an amide, an ether, an ester, a carboxylic acid and an alcohol.

12. The method of claim 1, wherein removing at least the portion of the liquid comprises decomposition, evaporation, heating, pyrolysis, or combustion.

13. The method of claim 1, further comprising removing a component from the porous material by a process comprising extraction, soaking, etching, melting, sublimation, dissolution, decomposition, evaporation, heating, combustion, or calcination, thereby forming another material.

14. The method of claim 1, further comprising hydrothermally heating the porous material.

15. The method of claim 1, further comprising treating the porous material to impart a microporosity to the porous material.

16. The method of claim 1, further comprising contacting the porous material with an additive to form a composite comprising the porous material and the additive.

17. The method of claim 1, further comprising contacting the porous material with a gas or a liquid.

18. The method of claim 1, further comprising treating the porous material or composite material to form another material.

19. A method of fabricating a porous material, the method comprising:
    combining a geopolymer resin and a liquid to form a mixture;
    solidifying the mixture to form a solid embedded with the liquid; and
    removing at least a portion of the liquid from the solid to yield the porous material, wherein removing at least the portion of the liquid comprises extracting the liquid and soaking the solid in one or more solvents selected from the group consisting of water, tetrahydrofuran, hexane, acetonitrile, dimethyl sulfoxide, a hydrocarbon, a halogenated hydrocarbon, a ketone, an aldehyde, an amine, an amide, an ether, an ester, a carboxylic acid and an alcohol.

\* \* \* \* \*